United States Patent [19]
Giordano et al.

[11] Patent Number: 5,859,779
[45] Date of Patent: Jan. 12, 1999

[54] PORTABLE POINT-OF SALE TERMINAL WITH DEVICE FOR INPUTTING SECURITY CODE ACCESS KEY

[75] Inventors: Joseph A. Giordano, Centreville; Karen S. Guthrie, Reston; Steven L. Clapper, Herndon, all of Va.

[73] Assignee: Mobil Oil Corporation, Fairfax, Va.

[21] Appl. No.: 725,276

[22] Filed: Oct. 2, 1996

[51] Int. Cl.$^6$ .................................................. G06F 19/00
[52] U.S. Cl. ............................... 364/479.01; 364/479.06
[58] Field of Search ..................................... 395/216, 217, 395/218, 219, 221, 224, 225; 364/479.01, 479.02, 479.06

[56] References Cited

U.S. PATENT DOCUMENTS

| | | |
|---|---|---|
| 4,722,054 | 1/1988 | Yoruza et al. . |
| 5,294,782 | 3/1994 | Kumar . |
| 5,489,773 | 2/1996 | Kumar . |

*Primary Examiner*—Reba I. Elmore
*Assistant Examiner*—Thomas Brown
*Attorney, Agent, or Firm*—Finnegan, Henderson, Farabow, Garrett, and Dunner, L.L.P.

[57] ABSTRACT

A point-of-sale (POS) processing system includes a host and a plurality of portable POS terminals. A local controller may be provided intermediate the host and the POS terminals, so that the POS terminals communicate with the host via the local controller. Each POS terminal includes a main portion and an extension portion. The main portion may be supported by a harness for strapping the main portion to a dealer's body. The extension portion may be small in size and light in weight so that it can be easily held with one hand. The main portion includes a two-way communication subsystem, a processor, and at least one data interface. The extension portion includes a reading device (e.g., a magnetic strip reader) for reading financial account data from an account authorization device (e.g., a credit card, debit card or prepay card). It further includes an input device (e.g., a keypad) for inputting a security code access key (e.g., a PIN), and a device for generating encrypted data representative of the security code access key. The main portion may also include a printer for printing receipts generated as a result of a sale transaction.

27 Claims, 15 Drawing Sheets

PORTABLE POINT-OF SALE TERMINAL WITH DEVICE FOR INPUTTING SECURITY CODE ACCESS KEY

BACKGROUND OF THE INVENTION

1. Reservation of Copyright

The disclosure of this patent document contains material which is subject to copyright protection. The copyright owner has no objection to the facsimile reproduction by anyone of the patent document or patent disclosure, as it appears in the U.S. Patent and Trademark Office patent file or records, but otherwise reserves all copyright rights whatsoever.

2. Field of the Invention

The present invention relates to a point-of-sale (POS) system used for selling goods and/or services.

3. Description of Background Information

Point-of-sale (POS) systems provide an electronic device (a local POS terminal) at a specific commercial location (i.e., a "point-of-sale") where items (goods or services) are paid for. At this point-of-sale, the local POS terminal gathers purchase-related information, including information regarding the item purchased and the money paid for the item. The sale is authorized against a central database, and the information is transferred to the central database for billing and other processing at the close of the sale. For example, the information may be relayed to an off-site database system which monitors inventory and other data, and to a financial organization.

POS systems have been employed which use customer-activated terminals (CATs). Such POS systems allow customers at a self-service station to execute card-based POS transactions (obtaining gas and paying for it electronically) without receiving any assistance from a gas station attendant. The customer inserts a private gas card, major bank card, debit card or prepaid card into a slot located at the gas pump. Account information is transmitted via dedicated leased lines to a host computer system provided at the company's headquarters, which quickly approves the transaction. Once a transaction approval is received, the pump is unlocked, and the customer can pump gas. The customer is allowed to obtain gas at a gas station more quickly and conveniently; and the company may continuously track the value of credit card and debit card transactions, as well as reduce the amount of paper-based records. Other benefits include the reduction of accounting errors and the ability for two-way communication between the company's headquarters and the service station.

In some situations, customers desire full service which requires the attendant to be more involved in the sales transaction. The attendant can provide and take payment for gasoline, while allowing the customer to remain in his or her vehicle. This is required by New Jersey law, which allows only service station attendants to pump gas.

However, the cost of CATs systems are not justified in a full service environment. The speed of service in full service stations is much slower as card transactions must be carried to the POS device for payment. Additionally, the use of PINs further complicates the process, since the customers are uncomfortable providing PINs to the attendant.

A customer may be accustomed to entrusting a credit card (not requiring a PIN) to a gas station attendant to bring into a store for verification. However, the customer will not likely be comfortable providing a debit card (or a credit card requiring a PIN) and his or her PIN to the attendant. This problem is becoming more relevant due to the increased popularity of using debit cards at POS terminals. Credit cards may eventually also require a PIN to complete a money transaction with a POS system. This has been proposed as a solution to "credit card fraud", which is becoming a reality for retailers and their customers who use POS systems. "Credit card fraud" is coined from the practice of producing operable unauthorized copies of credit cards with a magnetic strip on its back surface. The unauthorized copy is produced using a PC and a magnetic strip encoding device.

Each sale transaction includes two components: a delivery component and a payment component. During the delivery component, a good or service is delivered to the customer. During the payment component, payment is collected for the delivered good or service. It is well recognized that the efficiency with which a sale transaction is performed can be affected by only slight modifications in the procedures used to accomplish either of these two components of a sale transaction. This is true in varied types of dealer environments including retail environments such as gas stations. Even slight delays in either delivery of an item or collection of payment can cause the gas station (or other establishment) to incur significant costs. If the retail establishment does not increase its staff or somehow enhance its equipment to eliminate these delays, it may lose customers to competition. In either event, the establishment will incur some monetary loss.

In U.S. Pat. No. 4,967,366, Kaehler discloses a system including an integrated gasoline dispenser and POS authorization system together with an unattached PIN pad. The PIN pad is provided for the purpose of acquiring the PIN (personal identification number) of a customer and transmitting the PIN to the POS authorization system integrally provided with the gasoline dispenser. The system disclosed in this patent allows the customer to stay in his or her vehicle and also to privately input his or her PIN into the PIN pad without having to entrust the gas station attendant with such information. Once the customer inputs the PIN into the PIN pad, the gas station attendant then completes the collection component of the sale transaction. The attendant does this by directing the PIN pad's infrared transmitter toward the integrated gasoline dispenser to forward the information to the POS authorization system. The POS authorization system then communicates to a site controller which is programmed to communicate with an appropriate banking data network. The banking data network verifies both the PIN number and the credit card account and authorizes or denies the transaction. If the transaction is authorized, the attendant is then prompted by a visual display provided on the gasoline dispenser to carry out the remainder of the dispensing operation. When dispensing is complete, a receipt is printed at the gasoline dispenser and delivered by the attendant to the customer.

While the Kaehler system disclosed in U.S. Pat. No. 4,967,366 provides the customer with privacy to input his or her PIN, significant delays are encountered in performing sales transactions. The system is inconvenient to both the customer and the gas station attendant.

4. Terms and Acronyms

The following terms and acronyms are defined to facilitate reading and understanding the present disclosure.

POS (point-of-sale) terminal

A point-of-sale terminal is a device located where goods or services are paid for. The point-of-sale terminal executes the payment component of a sales transaction in which payment is provided in exchange for a good or service. The point-of-sale terminal may comprise one or more electronic devices which record purchase-related information at the point-of-sale and then relay the recorded information to a central system.

Account Authorization Device

A device having a recording medium for storing account data. By way of example, such a device can include a magnetic security card, or a credit card, debit card, or prepaid card having a magnetic strip on its back surface.

Security Code Access Key

A security code access key comprises a confirming code which is used as an extra layer to ensure security in accessing an account. A security code access key may comprise a personal identification number (PIN) which includes a combination of alphanumeric characters and can be specified with the use of a keypad. More generally, a security code access key may comprise a security access code which may be input by any appropriate code input device. By way of example, such a code could include a certain combination of signal levels, which may be input by reading those signal levels from a magnetic recording medium.

SUMMARY OF THE INVENTION

The present invention is provided to improve upon POS systems and methods for performing sale transactions. In order to achieve this end, one or more aspects of the invention may be followed in order to bring about one or more specific objects and advantages such as those noted below.

An object of the present invention is to provide a portable POS terminal for use by a dealer, such as a gas station attendant. The portable POS terminal may be harnessed to the dealer's body and be capable of performing functions such as reading financial account data from an account authorization device, inputting a security code access key, providing information, and printing a receipt. The POS terminal may also be capable of generating encrypted data representative of the security code access key before such encrypted data is transmitted to a POS host system which may be off-site. The account authorization device may comprise, for example, a credit card or a debit card, or another type of money card with a magnetic strip provided on its back surface. The security code access key may comprise a personal identification number (PIN) corresponding to the card.

A further object of the present invention is to provide such a portable POS terminal which increases the efficiency of handling sale transactions by simplifying the execution of a payment component of a sale transaction. More specifically, the portable POS terminal and overall POS system of the present invention should allow an item to be delivered concurrently with prompt collection of payment for the delivered item.

A further object of the present invention is to provide such a POS system including a portable POS terminal which will allow a customer to privately input a security code access key, such the customer's PIN at a location outside the viewing range of a retailer.

A further object of the present invention is to provide a POS system which is intrinsically safe in a gas station environment, because it facilitates control by the gas station attendant of a gas sale transaction.

The present invention, therefore, is directed to a POS system or a subsystem or method forming part of such a POS system. The POS system comprises a host and a plurality of portable POS terminals. The host may be off-site, i.e., at a different site remote from the site at which the portable POS terminals are deployed. The POS system may further comprise a local controller provided to channel communication between each POS terminal and the host.

Each POS terminal may be provided with a main portion, an extension portion, and a coupling device for coupling the main portion to the extension portion so that the extension portion is separable by a minimum distance from the main portion while the extension portion is still coupled to the main portion. The main portion has a total weight and outer dimensions permitting carrying by one person with little physical exertion. The main portion comprises a two-way communications subsystem, a main portion processor, and at least one data interface coupled to the processor. The main portion processor processes a sale transaction and sends and receives sales data to and from the host via the two-way communications subsystem.

The extension portion has a total weight and outer dimensions permitting one person to carry the extension portion with little physical exertion. The extension portion comprises a reading device, an input device and an encryption device. The reading device is provided for reading financial account data from an account authorization device. The input device is provided for inputting a security code access key. The encryption device is provided for encrypting data representative of the security code access key and forwarding the encrypted data to the main portion.

BRIEF DESCRIPTION OF THE DRAWINGS

The above and other objects, features and advantages of the present invention are further described in the detailed description which follows, with reference to the drawings by way of non-limiting exemplary embodiments of the present invention, wherein like reference numerals represent similar parts of the present invention throughout the several views, and wherein.

DETAILED DESCRIPTION OF THE EXEMPLARY EMBODIMENTS

Figure 1:
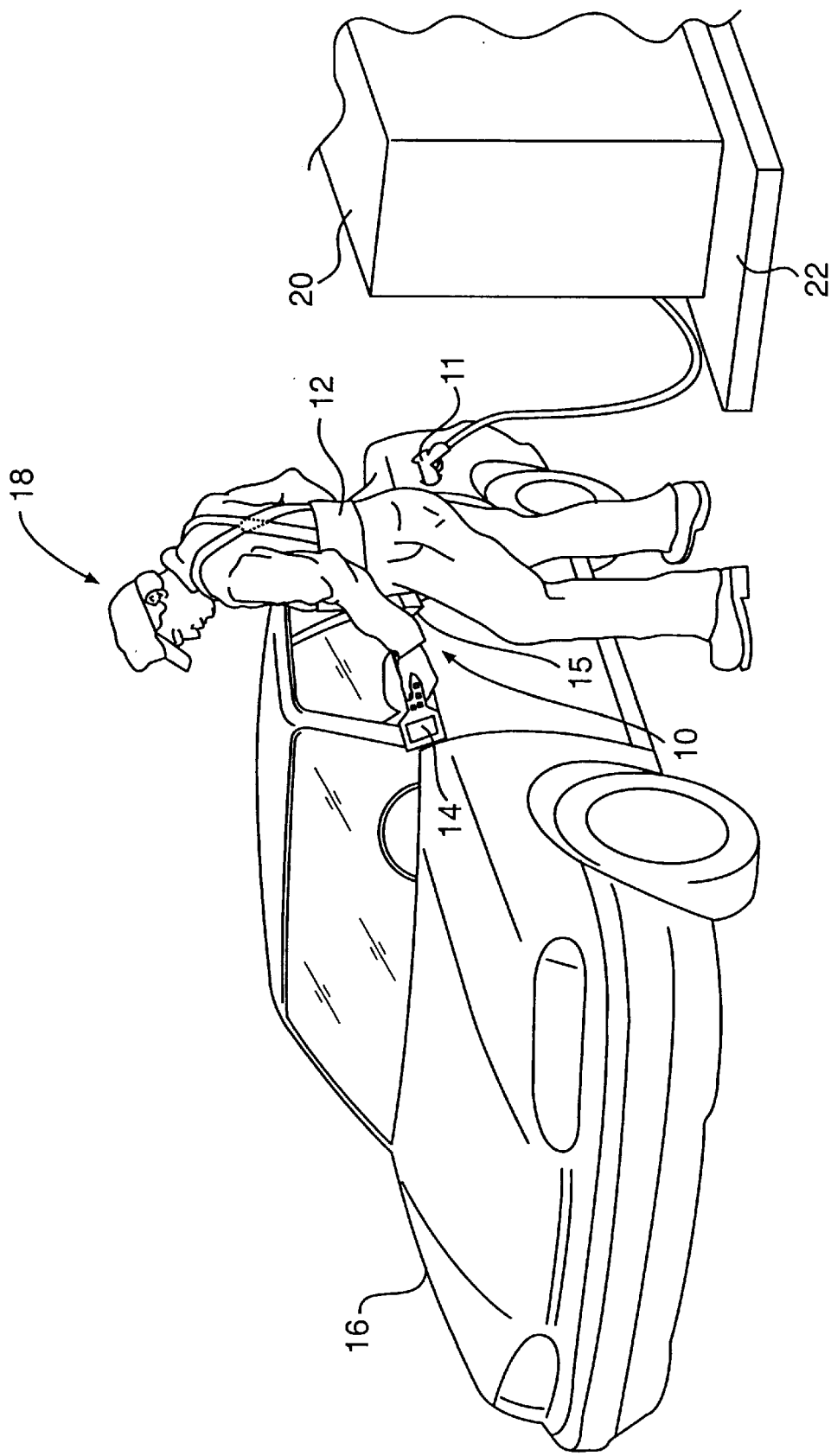
FIG. 1 illustrates a perspective view of a portable POS terminal used in a gas station.

Referring now to the drawings in greater detail, FIG. 1 presents a perspective view of an exemplary embodiment of a portable POS terminal being used in a gas station environment. A customer's automobile 16 is parked next to an island 22 upon which a gasoline dispenser 20 is provided. An attendant 18 is standing next to automobile 16, and is using a portable remote POS terminal 10 to make a sale transaction. The illustrated exemplary POS terminal 10 comprises a handheld extension portion 14 connected to a main portion 12 via a cord 15.

Figure 2:
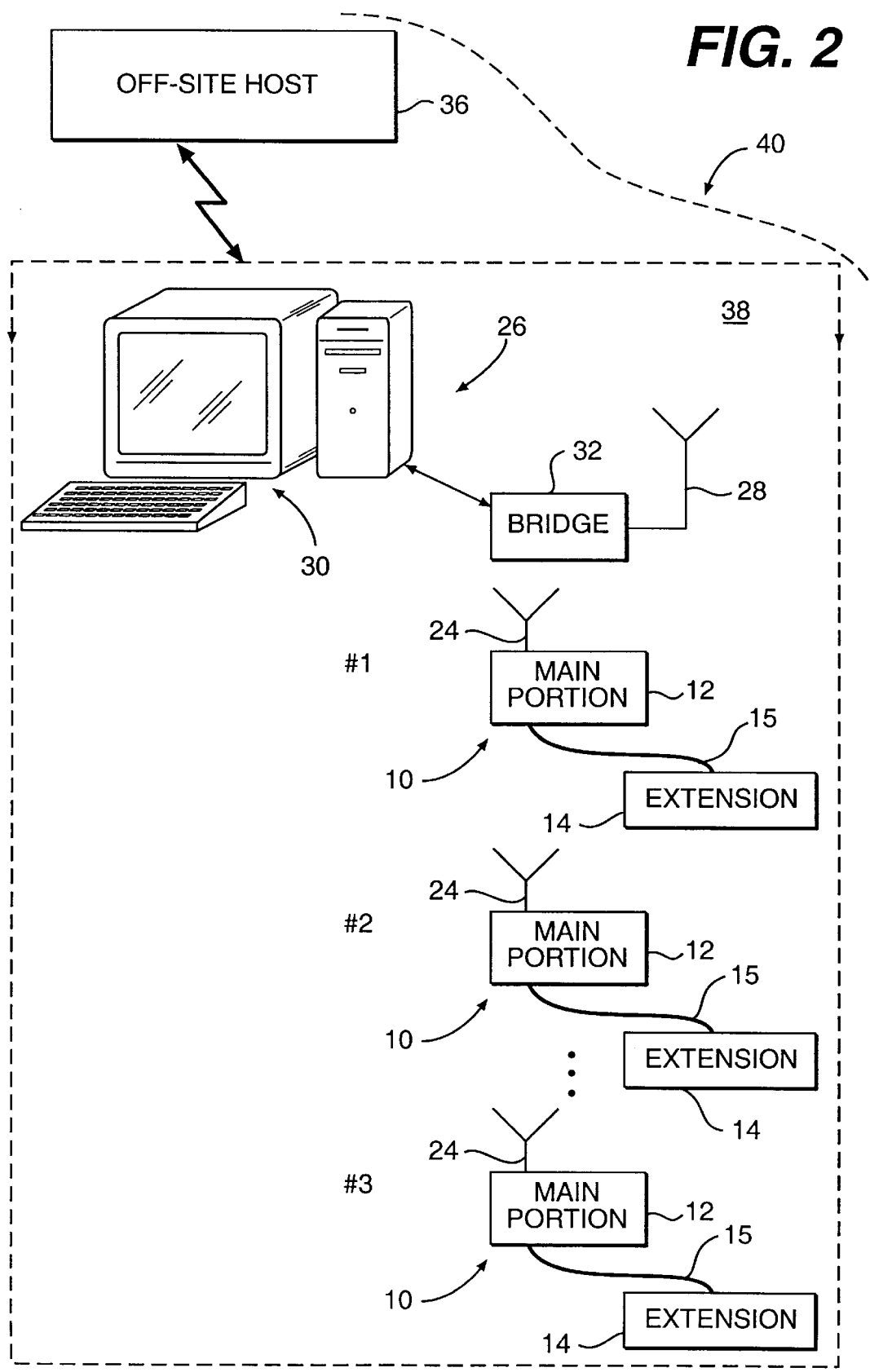
FIG. 2 is a block diagram of a POS system.

The illustrated portable POS terminal 10 comprises part of a POS system such as the POS system 40 illustrated in FIG. 2, which further includes an off-site host 36 and a local controller 26.

A portable POS terminal (e.g., POS terminal 10 as shown in FIGS. 1 and 2) may comprise a main portion, an extension portion and a coupling device (e.g., a short-distance communications link) for coupling the main portion to the extension portion so that the extension portion is separable by a minimum distance from the main portion while the extension portion is still coupled to the main portion. The main portion should have a total weight and outer dimensions to permit a person to carry the main portion with little physical exertion. The main portion may be strapped to a portion of the person's body, e.g., around the person's waist. Similarly, the extension portion should have a total weight generally less, and outer dimensions generally smaller, than that of the main portion to permit the person to carry the extension portion with little physical exertion. The extension portion may be attached to the person's body, attached to the main portion or held in one of the person's hands.

The main portion may be provided with a two-way communications subsystem, a main portion processor, and at least one data interface. The main processor processes a sale transaction and sends and receives sales data to and from a POS host system (e.g., the illustrated off-site host) via the two-way communications subsystem. At least one data interface of the main portion couples the main portion processor to the extension portion.

The extension portion includes a reading device (e.g., a magnetic card reader) for reading financial account data from an account authorization device (e.g., a credit or debit card) and an input device (e.g., a keypad) for inputting a security code access key (e.g., a PIN). In addition, the extension portion may include an encryption device which generates encrypted data representative of the security code access key.

The extension portion may be further provided with a display device which displays messages prompting a customer to provide the input device with a security code access key (e.g., a PIN). The reading device may specifically comprise a magnetic strip reader for reading the magnetic information on the back of a credit and a debit card or a prepaid money card.

When a customer pulls up in his or her vehicle such as in an automobile 16 as shown in FIG. 1, service station attendant 18 will approach automobile 16 and inquire as to which items or services the customer wishes to purchase. The customer may simply request that gasoline be pumped into automobile 16, in which case service station attendant 18 will place gas nozzle 11 into the receiving opening (not shown) of the gas tank (not shown) provided within automobile 16, and operate gasoline dispenser 20 to commence pumping of gasoline into the gas tank of automobile 16. Concurrently, while the gas is being pumped into automobile 16, attendant 18 may commence the payment portion of the sale transaction with the use of portable POS terminal 10.

As shown in FIG. 1, each main portion 12 may be harnessed to a dealer's torso, and extension portion 14 may be carried in one hand. Accordingly, both main portion 12 and extension portion 14 are of a weight and a size permitting a dealer to easily carry them. Extension portion 14 is of a small enough size and a low enough weight to allow a person to easily carry the same in one hand, e.g., as shown in FIG. 1.

Referring to the embodiment of FIG. 2 in further detail, POS system 40 comprises an off-site host 36 coupled to a local POS system 38 via a communications link 34. Local POS system 38 is shown as including a plurality of (N) portable POS terminals 10 and a local controller 26. Local controller 26 serves as an intermediate communications point between off-site host 36 and each of the N portable POS terminals 10. Accordingly, all communications between each portable POS terminal 10 and off-site host 36 are routed through local controller 26.

Local controller 26 includes a local computer (e.g., a PC) 30 coupled to a computer-to-RF bridge 32 and a local RF antenna 28. Local computer 30 is also provided with a communications interface (e.g., a modem) which is coupled to communications link 34 so that it may communicate with off-site host 36. Local computer 30 communicates with each portable POS terminal 10 via computer-to-RF bridge 32 which transmits and receives information in the form of RF signals through local RF antenna 28.

Each of the 1-N portable POS terminals 10 is shown in FIG. 2 as comprising a main portion 12 connected to an extension portion 14 via a cord 15. A remote RF antenna 24 is coupled to an RF transmitter/receiver (not shown in FIG. 2) provided as part of main portion 12. In the illustrated embodiment, a connection is made between main portion 12 and extension portion 14 with the use of a cord 15. A modification to the illustrated embodiment may include replacing cord 15 with a wireless connection, such as with an RF or optical (e.g., infrared) link (not shown).

There are advantages to the specific embodiment illustrated in FIG. 2, which provides a local controller 26 as an intermediate communications point placed intermediate off-site host 36 and each portable POS terminal 10. Local controller 26, if provided, e.g., in accordance with the illustrated embodiment, serves two primary purposes. First, it channels all messages being exchanged between host 36 and portable POS terminal 10, including controlling the flow of messages (records) from main portion 12 to host 36 and receiving responses (records) from host 36 and routing those responses to the appropriate destined portable POS terminals. Second, it maintains locally (e.g., in long-term and/or short term memory associated with local controller 26) reference copies for tables used by portable POS terminals 10 in processing sales transactions. Such tables may include a card/prompt table, which is set by host 36 to be system-wide, i.e., for all establishments. Other tables, such as price table and a tax table may be specific to the particular establishment at which the portable POS terminals and the local controller are deployed.

However, a POS system may be provided which does not comprise a local controller 26 as illustrated in FIG. 2, and each portable POS terminal 10 may be provided with the capability to directly communicate with off-site host 36.

Figure 3:
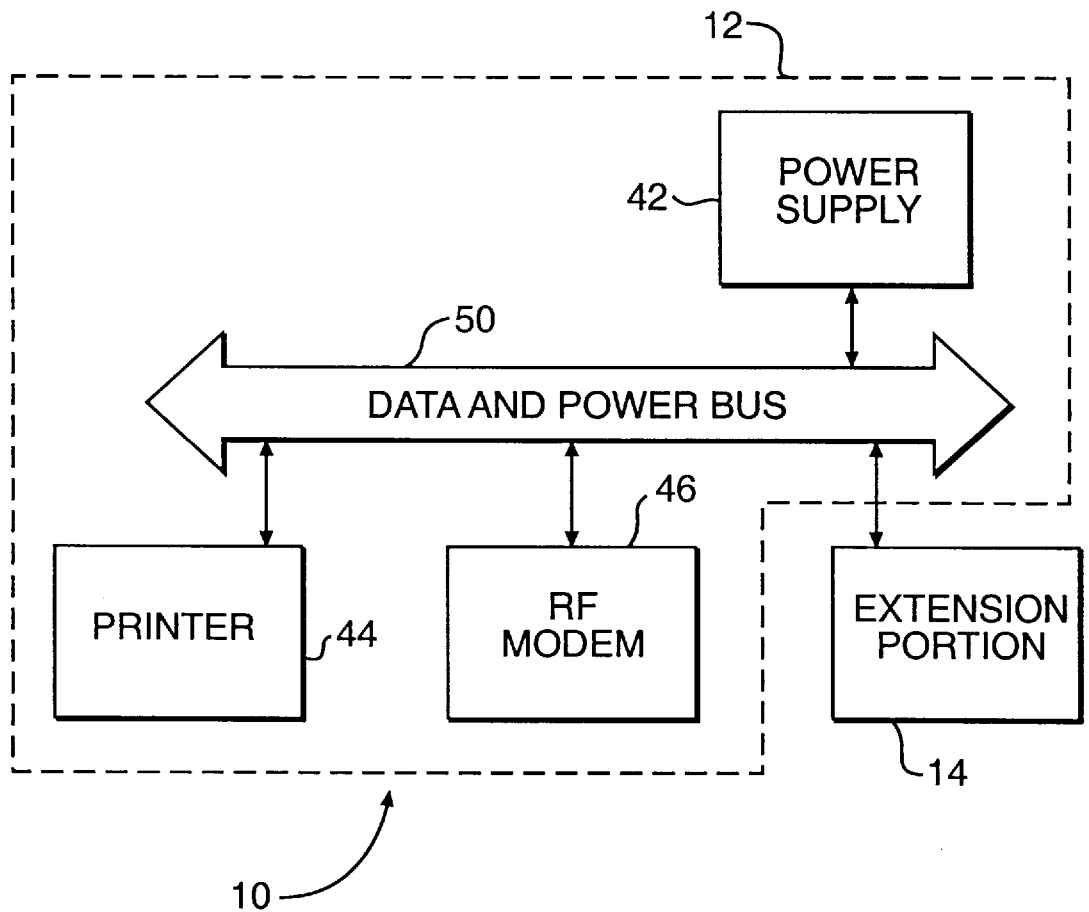
FIG. 3 is a block diagram of a portable POS terminal which may be employed with the POS system illustrated in FIG. 2.

FIG. 3 is a block diagram of a portable POS terminal 10 which may be employed with the POS system 40 illustrated in FIG. 2. Main portion 12 of the illustrated portable POS terminal 10 is provided with a number of elements coupled to each other by means of a common data and power bus 50. Main portion 12 includes a power supply 42, a printer 44 and an RF modem 46. Extension portion 14 is also connected to data and power bus 50.

Power supply 42 is connected to each of the devices 44, 46 and 14 via data and power bus 50 in order to supply power (from a DC battery) to those devices. Data and power bus 50 also provides a communication path to facilitate the transfer of data between each of the devices. For example, information to be printed on a receipt may be forwarded by extension portion 14 to RF modem 46 over data and power bus 50. RF modem 46 may then transmit through data and power bus 50 sales data to printer 44 for printing of a receipt.

In the illustrated embodiment, each device, including printer 44, RF modem 46, and extension portion 14 has its own housing, and power supply 42 is housed within one of the main portion devices, i.e., it is housed within either printer 44 or RF modem 46. Power supply 42 may be provided as a separately-housed component of main portion 12, or even as a component of extension portion 14. However, in order to reduce the weight of hand-held portion 14, power supply 42 may be provided as part of main portion 12. More specifically, it may be provided within the housing of either printer 44 or RF modem 46. A DC converter may be provided as part of data and power bus 50 to facilitate the proper coupling of power to the other devices within main portion 12 and extension portion 14.

Portable RF modem 46 may be implemented with a standard off-the-shelf component. Specifically, portable RF modem 46 may comprise an RF modem model no. RFM 3010-000501-1 provided by Symbol Technology.

Printer 44 may comprise a Comtec RP3 Journal thermal printer provided by Comtec Info Systems, 30 Plan Way, Warwick, R.I., 02886. The RP3 Comtec thermal printer is provided with a power supply which may comprise power supply 42 as shown in FIG. 2. Printer 44 may include an internal program that interprets data sent to it in order to control the printing process. The interface to the program provided within the RP3 printer is described in the RP3 Receipt Printer User's Manual, Revision 60, Jan. 18, 1995, the content of which is hereby incorporated by reference herein in its entirety.

Extension portion 14 may comprise a Data Card 290e pin pad, which is a standard pin pad provided by Data Card Corporation, 11111 Bren Road, Minnetonka, Minn. 55343. Should extension portion 14 be implemented with a 290e pin pad provided by Data Card, the pin pad interprets data sent to it and performs requested actions in accordance with a protocol as defined in the Multiple Emulation PIN PAD (MEPPA) Reference Manual (Part No. 144214-001, Revision 1.10, October 1995), the content of which is hereby expressly incorporated by reference herein in its entirety.

Each of the devices including printer 44, power supply 42, portable RF modem 46, and extension portion 14 may be interconnected with the use of a custom designed cable unit, part no. 50-16000-106 provided by Symbol Technology, one Symbol Plaza, Holtsville, N.Y. 11742-1300.

Main portion 12 performs several main functions including two-way communications to and from off-site host 36 via an RF antenna 24, processing of sale transactions, and communicating with extension portion 14 via a data interface provided within main portion 12. Extension portion 14 performs functions including reading financial account data from an account authorization device provided by a customer, inputting a security code access key (e.g., a PIN), and generating encrypted data representative of the security code access key before such data is forwarded to main portion 12. The encrypted data representing the security code access key is subsequently forwarded to off-site host 36 which verifies the account and authorizes (or denies) access to the account.

Portable POS terminal 10 is preferably a fully functional POS terminal in that it allows a customer to input account information by, for example, swiping his or her credit or debit card (or pre-paid card) within a slot of a magnetic strip reading device, and to subsequently input a security code access key such as a PIN with the use of an input device such as a keypad. Extension portion 14 is provided for this purpose.

Figure 5:
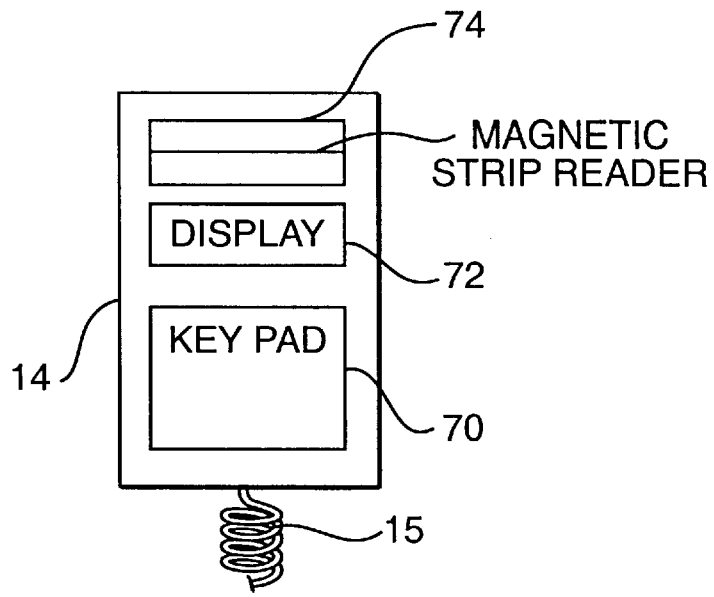
FIG. 5 illustrates a hand-held extension portion of a portable POS terminal.

FIG. 5 illustrates extension portion 14 in more detail. As shown in FIG. 5, extension portion 14 may be provided with a magnetic strip reader 74, a display 72, and a keypad 70. FIG. 5 also illustrates an exemplary cord 15 in more detail. The cord 15 illustrated in FIG. 5 is in the form of a coil generally similar to the cord which is typically used to attach a telephone handset to a main telephone housing.

Figure 4:
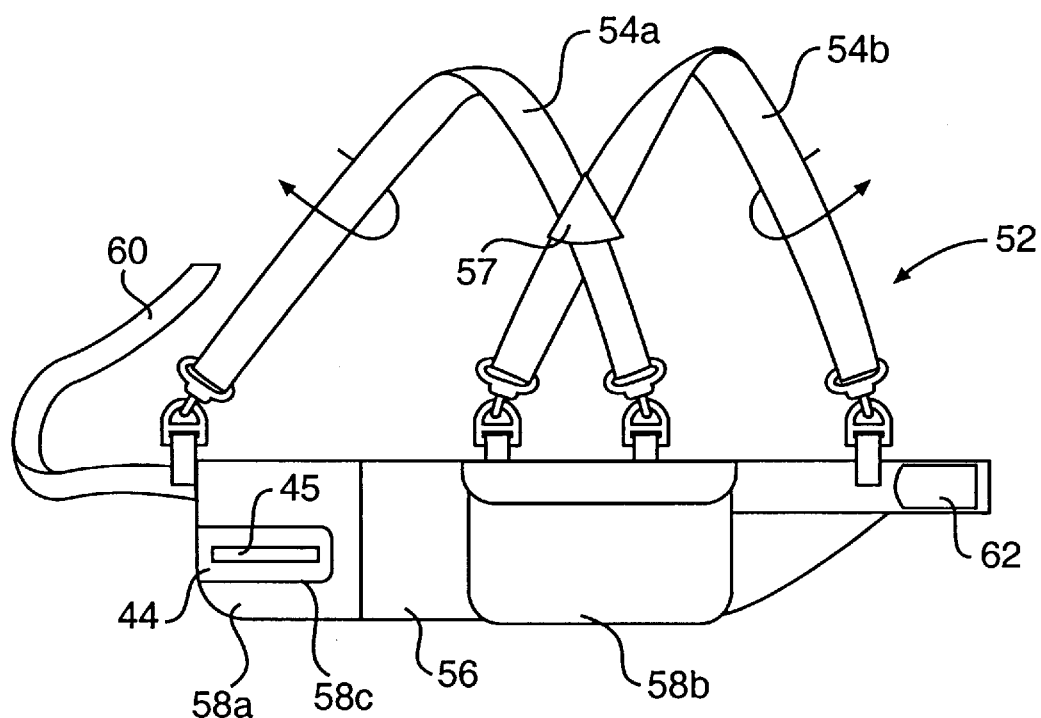
FIG. 4 is an elevated back view of a harness for strapping a portable POS terminal to an attendant, for example, as illustrated in FIG. 3.

As noted above, main portion 12 of portable POS terminal 10 may be harnessed to the torso of a dealer such as a gas station attendant 18 as shown in FIG. 1. In order to disperse or distribute the weight of the various pieces of portable POS terminal 10, each of the main portion devices together forming main portion 12 (including, for example, printer 44 and RF modem 46) may be harnessed to (placed against) a different portion of the dealer's torso. This may be achieved with the use of a flexible belt assembly as shown in FIG. 4. The illustrated harness 52 comprises a belt 56 and a pair of shoulder straps 54a, 54b. Belt 56 has at one end a buckle 62 and at a second end a waist strap 60 which may be inserted into an opening provided as part of buckle 62 and secured around the waist by engaging buckle 62. Each of shoulder straps 54a and 54b may be connected to an upper portion of belt 56 by means of a loop-type fastener or by another appropriate connection mechanism. In the alternative, each end of each shoulder strap 54a, 54b may be directly sewn to belt 56 at an appropriate location to allow harness 52 to be secured to the torso of a dealer.

The dealer simply places his or her arms in each of the side openings formed by the pair of shoulder straps 54a, 54b, as shown by the arrows provided in FIG. 4, and places belt 56 against his or her waist and back section 57 against his or her back. Waist strap 60 may then be wrapped around the front of the dealer's torso and engaged with buckle 62 in order to completely secure harness 52 to the dealer's torso.

The illustrated belt portion 56 has two main pockets, i.e., a first pocket 58a and a second pocket 58b. First pocket 58a is provided for carrying a printer, and includes an opening 58c which corresponds in position and size to a paper dispenser 45 which forms part of printer 44. Second pocket 58b may house RF modem 46 together with an RF antenna 24 connected thereto. Second pocket 58b may further contain the cable which interconnects each of the various pieces of main portion 12. Belt portion 56 may be provided with an intermediate pocket extending between first pocket 58a and second pocket 58b to hold such a cable assembly.

By distributing several devices throughout a belt assembly or a harness 52 as shown in FIG. 4, the strain experienced by the dealer carrying the portable POS terminal 10 is reduced. The strain experienced by the dealer is further reduced by the fact that only one battery is provided to power all of the devices of portable POS terminal 10.

Harness 52, shown in FIG. 4, may comprise a belt provided by Symbol Technologies such as Symbol Part No. 3141.

Figure 6:
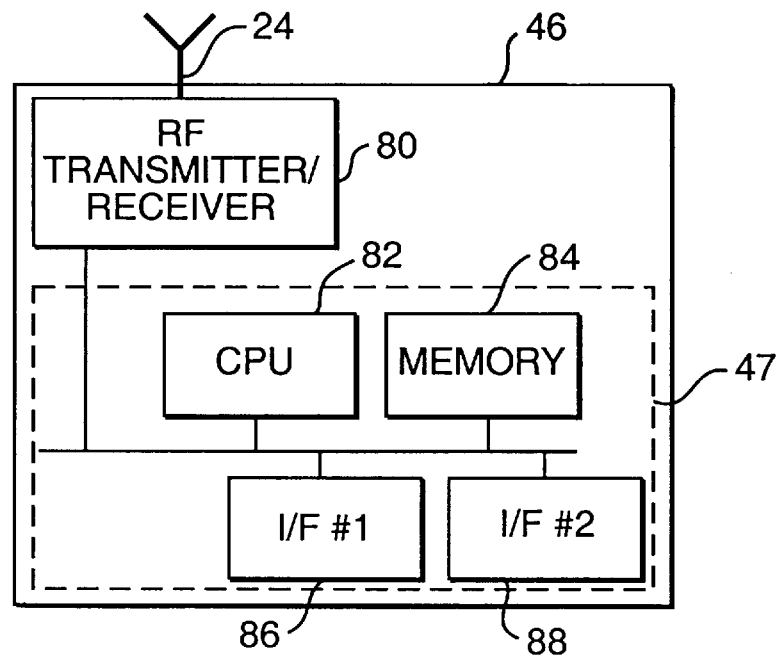
FIG. 6 is a block diagram representing the components which may form part of an RF modem of a portable remote POS terminal.

FIG. 6 is a block diagram illustrating the various components which form part of an RF modem 46. As shown in FIG. 6, RF modem 46 includes an RF transmitter/receiver 80 coupled to a remote RF antenna 24, and further coupled to a bus structure. The bus structure interconnects a main portion CPU 82, a main portion memory 84 (which may comprise a RAM), a first main portion interface 86, and a second main portion interface 88. The bus structure shown in FIG. 6 is merely illustrative, and may take the form of any recognized bus or interconnection structure which facilitates the interconnection of the various components of main portion 12. First main portion interface 86 is provided for connecting main portion 12 to extension portion 14, and second main portion interface 88 is provided for connecting main portion 12 to printer 44.

Figure 7:
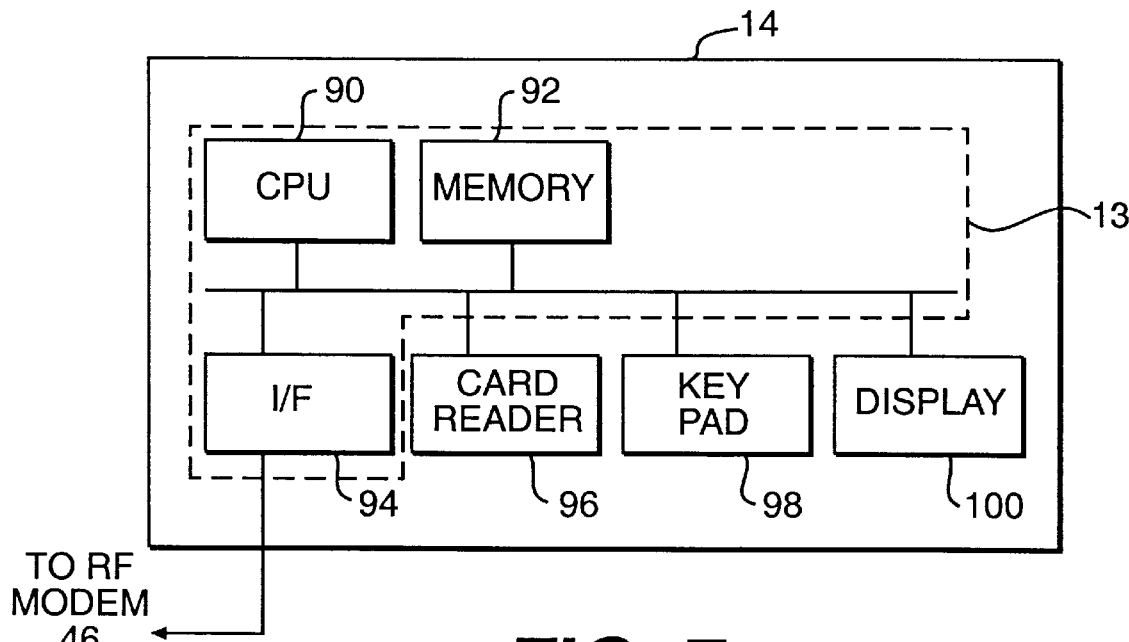
FIG. 7 is a block diagram representing the components which may form part of the extension portion.

FIG. 7 is a block diagram illustrating the various components which may form part of extension portion 14. As shown in FIG. 7, extension portion 14 may include an extension portion CPU 90 connected to several other components via a bus structure, including an extension portion memory 92, and an extension portion interface 94. Other devices connected to the bus structure include card reader 96, keypad 98 and display 100.

Figure 8:
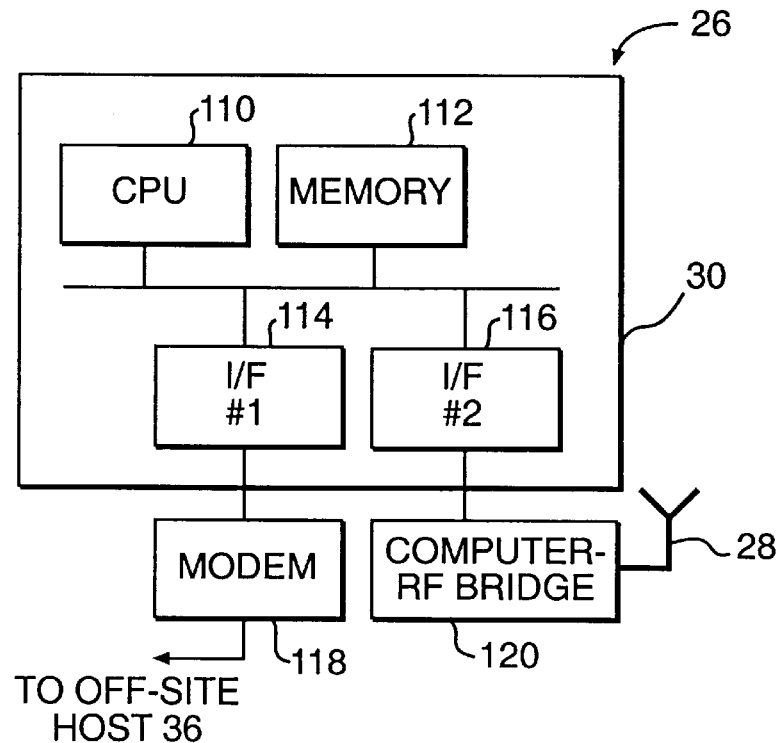
FIG. 8 is a block diagram illustrating the components which form part of a local controller.

FIG. 8 is a block diagram illustrating a local controller 26, which is implemented with the use of a local computer 30. Local computer 30 comprises a number of devices, coupled to each other by a bus structure. Those devices include, among other devices, a local controller CPU 110, a local controller memory 112, and first and second local controller interfaces 114, 116. Local controller interfaces 114 and 116 may comprise serial ports, or other suitable hardware communications interfaces. A modem 118 is connected to first local controller interface 114 and provides a connection between local controller portion 26 and off-site host 36. A computer-to-RF bridge 120 is connected to second local controller interface 116, and includes a local RF antenna 28 which forms part of an RF channel for communicating with each of the respective portable POS terminals 10, e.g., as illustrated in FIG. 2.

Local computer 30 may comprise an IBM compatible PC, and computer-to-RF bridge 32 may be implemented with a Symbol Technologies serial access bridge SAB, Lite (SAB 2070-050) with a power adaptor. Local RF antenna 28 may comprise a Symbol Technologies Sandra D antenna. The interfaces provided as part of portable RF modem 46 may comprise serial interfaces, such as the serial interfaces which are provided in an off-the-shelf Symbol Technologies RF modem part no. RFM3010.

Figure 9:
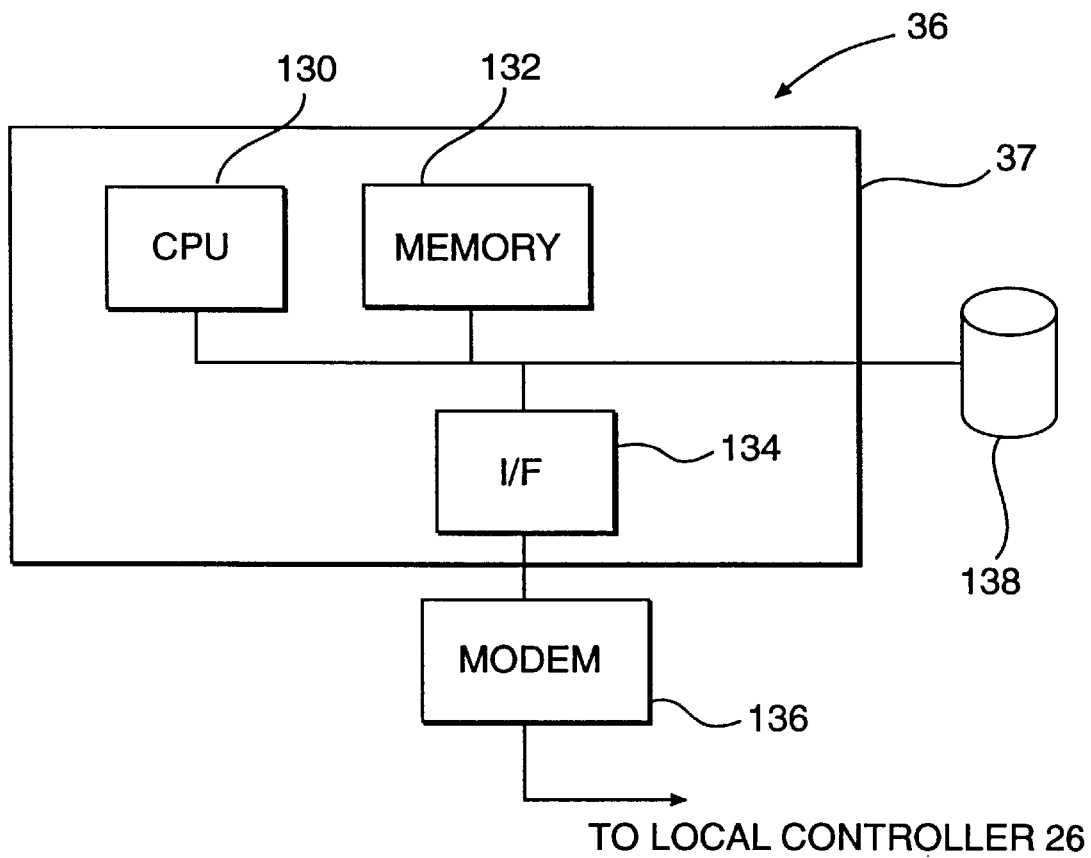
FIG. 9 is a block diagram illustrating the components which may form part of a host system.

FIG. 9 is a block diagram illustrating various devices which may form part of an off-site host 36. Off-site host 36 may comprise a host computer system which includes several devices connected to each other via a bus structure. The details of the bus structure are not disclosed herein, as such details are not directly pertinent to the present invention. The illustrated off-site host 36 includes a host CPU 130, a host memory 132, and a host interface 134. A modem 136 is connected to host interface 134, and provides connection of host 36 to local controller 26. Host 36 may further comprise a long-term storage 138, e.g., magnetic or magneto-optic disk or serial tape storage devices.

Figure 10A:
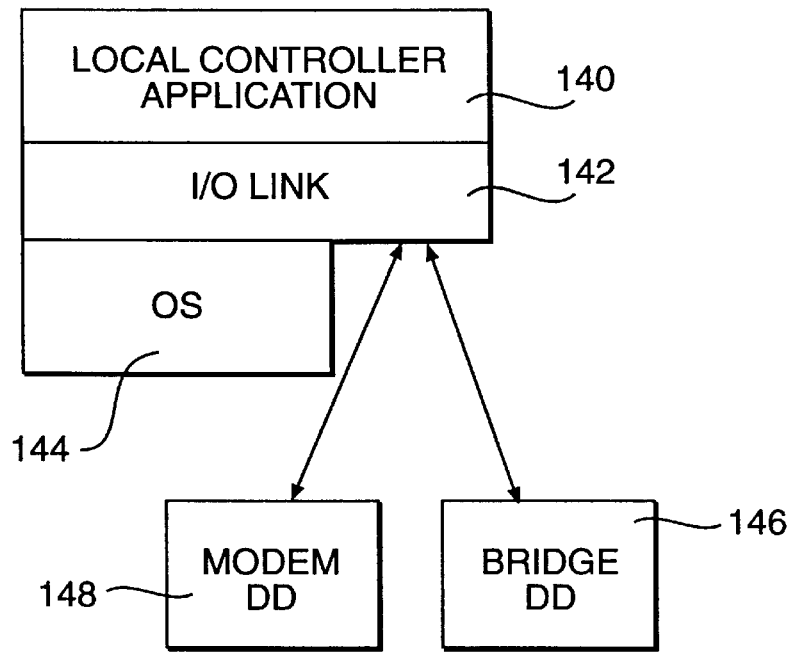
FIG. 10A is a block diagram of the software hierarchy which may form part of a local controller processor.

FIG. 10A is a block diagram illustrating the basic hierarchy of the software that may be utilized to control the operation of local controller CPU 110 of local controller 26. The software hierarchy includes an operating system layer 144 provided at a lower level and an i/o link layer 142 provided at a middle level. A high-level software layer is provided which comprises a local controller application layer 140. The software of local controller 26 may comprise a plurality of device drivers, including a modem device driver 148 and a computer-to-RF bridge device driver 146, each directly coupled to i/o link layer 142.

Figure 10B:
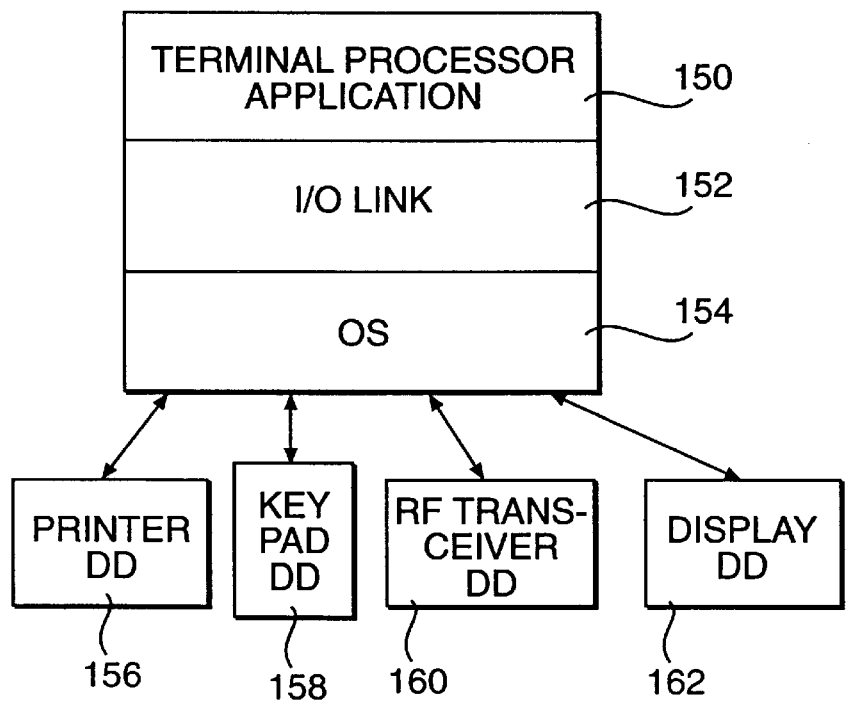
FIG. 10B is a block diagram of the software hierarchy which may form part of an RF modem provided within a main portion.

FIG. 10B is a block diagram illustrating the basic hierarchy of the software which may be used to control the operation of RF modem CPU 82 which forms part of RF modem 46 as illustrated in FIG. 6. The illustrated exemplary software hierarchy includes an operating system layer 154 provided at a lower level and an I/O link layer 152 provided at a middle level. A terminal processor application layer 150 is provided at a high level. A plurality of device drivers may be provided, each coupled to operating system layer 154. In the alternative, each of the device drivers may be coupled directly to either I/O link layer 152 or terminal processor application layer 150. The illustrated device drivers include a printer device driver 156, a key pad device driver 158, an RF transceiver device driver 160 and a display device driver 162. Key pad device driver 158 and display device driver 162 are provided to facilitate the input and output of data respectively from and (referring back to FIG. 7) key pad 98 and display 100 provided within extension portion 14 of portable POS terminal 10. Printer device driver 156 and RF transceiver device driver 160 are provided to facilitate the input and output of data respectively from and to (referring back to FIG. 3) printer 44 and RF modem 46 provided within main portion 12. While these functions are controlled by separate device drivers as shown in FIG. 10B, one or more unitary device drivers may be provided for controlling the interfacing and transfer of data to and from plural sets of the hardware devices, rather than providing a separate device driver for each hardware device.

Figure 11:
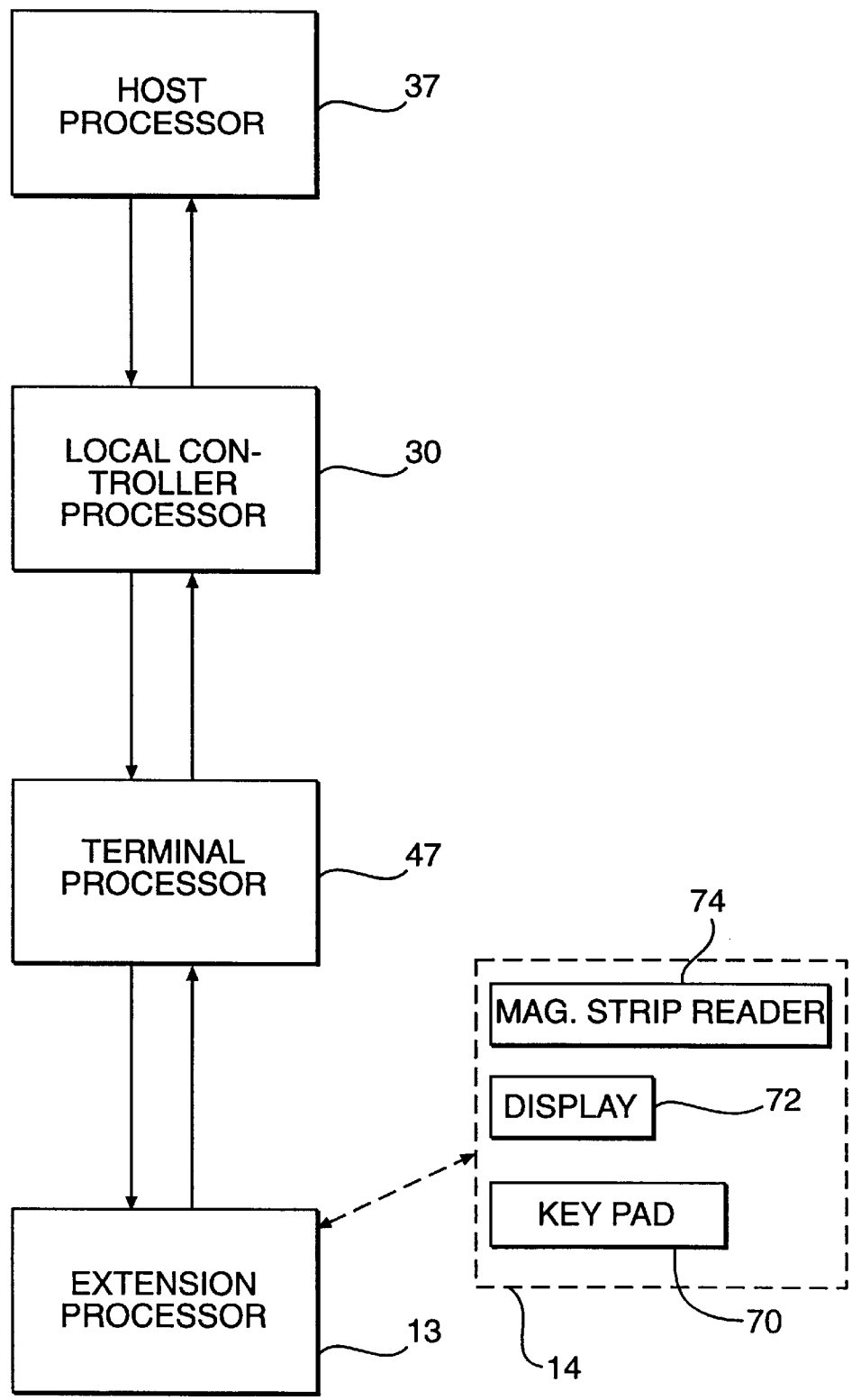
FIG. 11 is a block diagram representing the communication paths among the various processors of the POS system illustrated in FIG. 2.

FIG. 11 is a block diagram generally representing how the various POS entities may communicate with each other as the illustrated POS system 40 processes a sale transaction. The POS entities illustrated in FIG. 11 include host processor 37, local controller processor 30, terminal processor 47, and extension processor 13. Each of these processors may be implemented with, among other elements, a CPU, a memory and a bus structure. For example, as shown in FIG. 9, host processor 37 may comprise, among other elements, a host CPU 130, a memory 132 and a bus structure. Referring back to the POS system 40 shown in FIG. 2, host processor 37 forms part of off-site host 36. Local controller processor 30 is the computer portion of local controller 26. Terminal processor 47 is a processor provided as part of a main portion 12 of a portable POS terminal 10. Extension processor 13 comprises a processor portion of an extension portion 14 of a POS terminal 10.

Host processor 37 transfers information back and forth to local controller processor 30. Local controller processor 30 transfers information to and from both host processor 37 and terminal processor 47. Terminal processor 47 communicates directly with local controller processor 30 and extension processor 13. Extension processor 13 communicates directly with terminal processor 47.

Host processor 37 is primarily concerned with performing management-type functions, and may be provided off-site. More specifically, host processor 37 may form part of a host system which is located at the headquarters of the retail establishment using the POS system. Host processor 37 may perform functions such as verifying account information and whether an account contains sufficient funds to complete a sale transaction, decrypting PIN and other verification information in order to verify that a customer has the authority to access certain funds tagged to a particular account; and monitoring sales data and other statistics regarding consumer behavior and business activity in general.

Local controller processor 30 is provided to manage the communications between host processor 37 and each terminal processor 47 provided within each portable POS terminal 10. A local controller processor 30 may also provide other local management functions. Local controller processor 30 may translate and route messages (records) being exchanged between host processor 37 (MOCC) and terminal processor 47. It may also maintain a list of all portable POS terminals that are connected to the POS system. Local controller processor 30 may maintain a reference copy of various tables to be used in connection with sale transactions, including, for example, a tax table, a price table, a card/prompt table, and a configuration table. It may further perform processing to insure that each terminal processor 47 of each corresponding portable POS terminal 10 has an up-to-date and accurate copy of such tables.

Each terminal processor 47 is charged with very specific responsibilities in obtaining sales-related data important to a sale transaction. It may process input sale information and other information input by a dealer, e.g., a gas station attendant. Terminal processor 47 may perform processing needed to verify credit and debit cards. It may accept encrypted PINs and forward the same to host processor 37 via local controller processor 30. Terminal processor 47 may obtain authorization for credit and debit transactions from host processor 37, and accordingly complete a sales transaction once such authorization is obtained. Terminal processor 47 may also be configured to control the printing of receipts by a printer which forms part of portable POS terminal 10.

Extension processor 13 resides within extension portion 14 of a portable POS terminal 10, and is the point at which financial account data is read from an account authorization device such as credit, debit, or pre-paid card, and security code access key information such as a PIN is input by a customer. In order to prevent compromising of (i.e., unauthorized access to or acquisition of) important information, such as information regarding a security code access key, extension processor 13 may be provided with a mechanism for encrypting the security access key (e.g., PIN) before forwarding such information to terminal processor 47 for subsequent transmission to host processor 37 via local controller processor 30.

In the illustrated embodiment, local controller processor 30 performs several initialization steps. It verifies that certain system parameters, including address and other information, are valid. Local controller processor 30 establishes communication with host processor 37 and with terminal processors 47 via computer-to-RF bridge 32. It may further restore a number of tables residing in its RAM from a local copy that is kept on a system disk. If a local copy of a card/prompt table does not exist within the local memory of local controller processor 30, it will obtain and load a new copy from host processor 37.

Each terminal processor 47 provided in a corresponding portable POS terminal 10 may perform several initialization steps at boot time. It may load configuration information needed to configure POS terminal 10 and its components, e.g., RF transmitter/receiver 80 (see FIG. 6). It may perform a log-on procedure to log-on to local controller processor 30. Terminal processor 47 may also verify the presence of a "working key" used for DES encryption. Once terminal processor 47 has logged on to local controller processor 30, it will then download any newly updated tables which it needs updated for its transaction processing from local controller processor 30. Once this is done, terminal processor 47 may perform a log-off from local controller processor 30.

It may then load fuel key mapping information from a disk or other type of local memory, and verify that connected devices (including an extension portion 14 and printer 44 (see FIG. 3)) are properly connected and functioning. The fuel key mapping information may comprise information regarding the assignment of keys within the extension portion's key pad to correspond to certain designated fuel types. Once the above-mentioned processing steps are performed, terminal processor 47 may cause the display of an idle prompt, signifying the end of its initialization.

Terminal processor 47 may be designed so that it can perform several basic processing functions, such as the following:

Sales transaction

In performing a sales transaction, terminal processor 47 will accept data. Such data may comprise data read with a magnetic strip reader and other data keyed in by an operator and forwarded to terminal processor 47 from extension processor 13. In addition, terminal processor 47 will format records and communicate those records to host processor 37 via local controller processor 30. Terminal processor 47 will also receive return messages (records) forwarded from host processor 37 and print sales receipts at the conclusion of a sale transaction.

Authorization

During authorization processing, terminal processor 47 will accept account number information from a magnetic strip on a card or from other account data that is keyed in. It will format and send records containing such data to host processor 37 for the purpose of credit authorization. Terminal processor 47 will then receive an authorization record from host processor 37 either authorizing or denying the completion of a sales transaction, and cause extension processor 13 to display a message indicating the result of the authorization request.

Request by dealer for credit card sales summary report

Terminal processor 47 may be designed so that it can format and send records to host processor 37 requesting a card sales summary. Terminal processor 47 will then receive data from host processor 37 and print transactions in the form of a sales summary.

Price table update

Terminal processor 47 may obtain a price table update or may have a price table update function which allows a dealer (e.g., a service station attendant) to update a table of gasoline prices stored locally at terminal processor 47. Additionally, terminal processor 47 will allow printing of the current price table, and will retain prices for use in calculating gasoline quantities and dollar amounts corresponding to each sale.

Tax table update

In performing a tax table update, terminal processor 47 will allow a dealer to update a tax table with certain tax rates corresponding to certain products. Terminal processor 47 uses this data to calculate proper sales tax on taxable products. It may include a function of printing a report showing the current tax rate and the products on which taxes will be applied.

Cancellation of sale

In performing a cancellation of sale function, terminal processor 47 may accept data keyed in by an operator (e.g., via extension processor 13) in order to cancel an erroneous sale. If this occurs, terminal processor 47 will format and send a record to host processor 37 (via local controller processor 30) requesting cancellation of the sale transaction request. Terminal processor 47 will then receive and display (via extension processor 13) an appropriate message received from host processor 37. If a sale is cancelled, terminal processor 47 will cause the printing of a cancelled receipt.

Establish and/or change dealer password

Terminal processor 47 may be provided with the capability to establish or change a dealer password. A dealer may input data through the use of extension processor 13 (and a keypad connected thereto), and a terminal processor 47 may retrieve that information in order to update a multiple-digit password (e.g., four digits) which is required in order for an operator to gain access to terminal processor functions needed to perform operations related to tax tables and price tables. Terminal processor 47 may also be capable of causing printing of a record indicating a current password of a dealer.

Terminal processor 47 may be configured so that it can perform various other functions related to the execution of sales-related transactions. By way of example, several different POS terminal functions may be provided as disclosed in a Mobil manual entitled "POS Terminal Specifications" issued Jan. 24, 1994, revised Nov. 1, 1994, the content of which is hereby expressly incorporated by reference herein in its entirety.

The processes illustrated in each of FIGS. 12A–12D will now be described with reference to FIG. 11. Each of the processes illustrated in FIGS. 12A–12D is performed by terminal processor 47. Terminal processor 47 responds to information provided to it by host processor 37 and extension processor 13, and forwards information to either host processor 37 or extension processor 13. Information derived from extension processor 13 may be input with the use of a magnetic strip reader 74 or a keypad 70. Information forwarded from terminal processor 47 to extension processor 13 is displayed on display 72 of extension portion 14. Information sent from terminal processor 47 to host processor 37 is sent via local controller processor 30. Local controller processor 30 handles the transfer of information back and forth between host processor 37 and terminal processor 47 in the form of one or more records having a predetermined format. Information received from host processor 37 is received via local controller processor 30 and interpreted by terminal processor 47 before certain processing steps are performed in relation to a sale transaction.

Figure 12A:
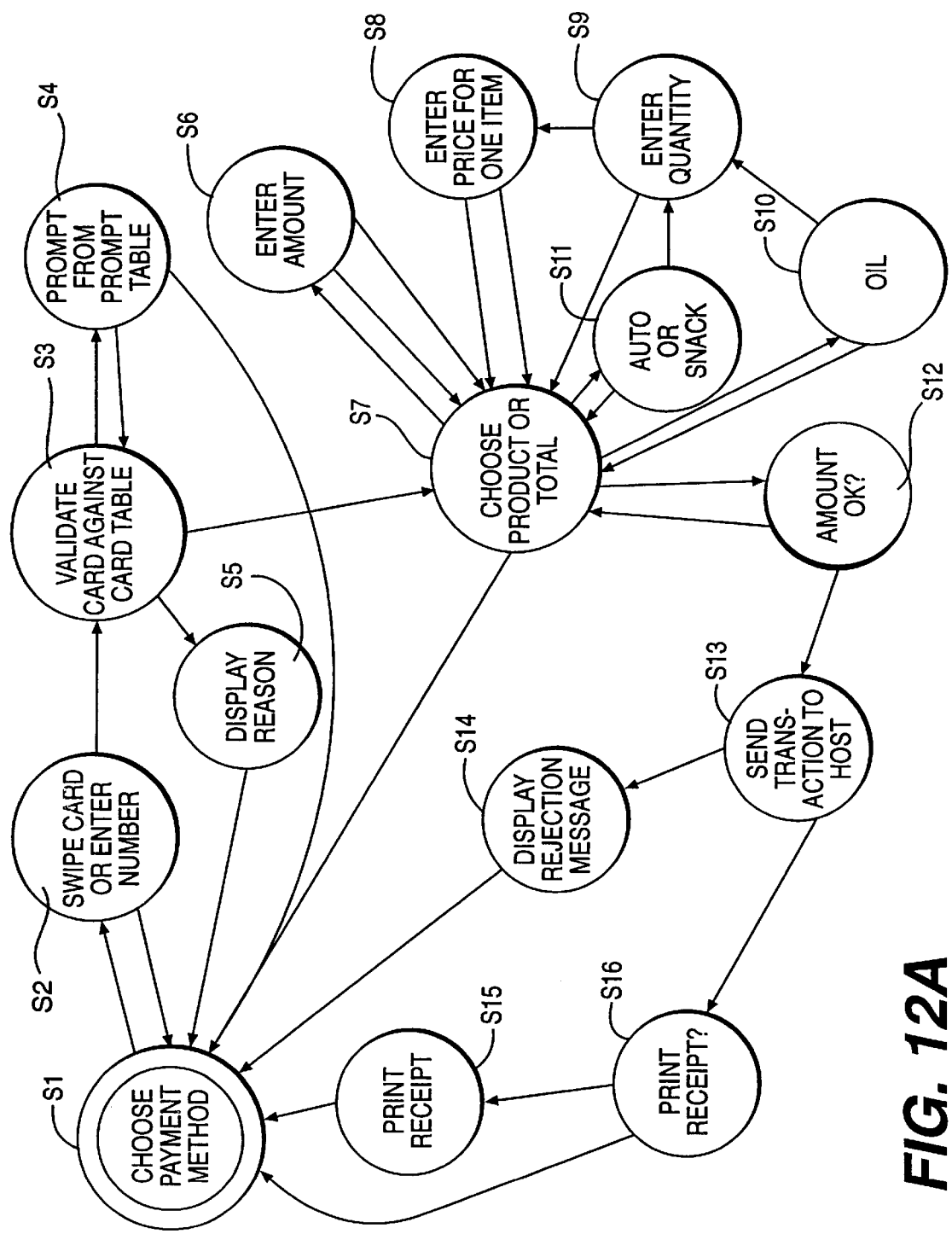
FIG. 12A is a state diagram representing a credit sale process which may be performed by a main portion of a portable remote POS terminal.

FIG. 12A is a state diagram representing the steps that may be performed by terminal processor 47 in performing a credit sale transaction.

While the terminal processor is in an initial state S1, a payment method is chosen. If a credit sale transaction is chosen through the use of keypad 70 (in extension portion 14), the terminal processor will be forwarded to state S2, at which point the program will await the inputting of financial account data from an account authorization device. That information can be obtained by either swiping the card across the slot of magnetic strip reader 74 or by entering a number with the use of keypad 70.

If, while in state S2, a clear command is entered via keypad 70, the process will return to state S1. If either an account number is entered or a card is swiped while the process is in state S2, the process will proceed to state S3. In state S3, the process will validate the card against a locally saved card table (saved locally to local controller processor 30 and/or locally to terminal processor 47).

The terminal processor may be required to check for extra verification data, in which case the process proceeds to state S4. The terminal processor is then prompted by the host processor for such extra verification data in accordance with a prompt table which may also be locally saved in the memory associated with local controller processor 30 and/or in the memory associated with terminal processor 47. An example of information to be prompted for in the prompt table is a check digit which may be, e.g., the last digit of a credit card or debit card number. A certain algorithm may be performed in accordance with certain parameters provided in the prompt table in order to calculate what that check digit should be. Once the extra verification data is provided by terminal processor 47 to host processor 37, the process then returns from state S4 to state S3, where validation is completed.

If the validation fails, the process proceeds from state S3 to state S5, where a reason is displayed on display 72. The process then returns to state S1, where terminal processor 47 will await the choosing of a payment method. If the validation passes and the card is deemed okay at state S3, the process proceeds from state S3 directly to state S7, where the dealer is prompted by display 72 to choose a product or to request a total for all products that have already been chosen. The dealer may then specify a fuel category if fuel is to be provided. If this occurs, the process proceeds to state S6, where an amount of fuel is entered with keypad 70. If while at state S6, a clear button is pressed on keypad 70, the process returns to state S7. If an amount is entered at state S6, the process returns to state S7 as well.

While the process is in state S7, the dealer may also indicate a merchandise category instead of a fuel category. If this occurs, the process proceeds from state S7 to state S11. If a clear button is pressed at this point, the process returns to state S7. If a clear button is not pressed and a specific automobile product or snack is chosen while in state S11, the process proceeds to state S9 where a specific quantity may be entered. If a specific quantity is entered, the process proceeds from state S9 to state S8. If, however, while in state S9, a clear button is pressed on keypad 70, the process will return directly to state S7. If a quantity is entered and the process is in state S8, a price may be entered at this point for one item. If this occurs, or if the clear button is pressed, the process will proceed directly from state S8 to state S7.

A third type of category, other than a fuel category or a merchandise category, may include oil products. If this category is identified with the use of keypad 70, the process will proceed from state S7 to state S10, where the dealer will be prompted by display 72 to input the specific type of oil to be purchased. If this is indicated, the process will proceed to state S9, where a quantity may be entered via keypad 70. However, if while in state S10, the dealer presses a clear button on keypad 70, the process will return directly to state S7.

If, in state S7, all products have been chosen, and an amount has been input for those products, a "total" button may be pressed on keypad 70, which will cause the process to proceed from state S7 to state S12. The dealer will then be prompted via display 72 to confirm if the total monetary amount corresponding to the purchases is acceptable. If the dealer answers "n" through the use of keypad 70, the process will return to state S7. However, if the dealer answers "yes" with the use of keypad 70, the process will proceed from state S12 to state S13.

At this point, records formed during the transaction will be forwarded to host processor 37 via local controller processor 30, and terminal processor 47 will await a response from host processor 37. Host processor 37 will then verify the transaction and return either a verification or a rejection to terminal processor 47 via local controller processor 30. If a verification is received by terminal processor 47, the process will proceed from state S13 directly to state S16. If terminal processor 47 receives a rejection notification from host processor 37, it will proceed from state S13 to state S14, at which point a rejection indication will be displayed on display 72. If a clear button is pressed on keypad 70, or a certain amount of time (e.g., 30 seconds) has passed, the process will return from state S14 back to state S1.

While in state S16, the dealer is prompted by display 72 to indicate whether a receipt is desired. If the dealer indicates the desire for a receipt, the process will proceed directly to state S15, and a receipt will be printed. Once this process is completed, the process will return to state S1. However, if the dealer denies the request for a receipt, the process will proceed from state S16 directly to state S1.

If while in state S1, a debit sale transaction payment method is requested, the process will proceed from state S1 to state S2 as shown in FIG. 12A and the remaining transitions between the various states will generally be identical to those as illustrated in FIG. 12A and as described above. However, state S4 is replaced with a modified state S4' where the prompt from the prompt table includes a prompt via display 72 for inputting of a PIN.

Figure 12B:
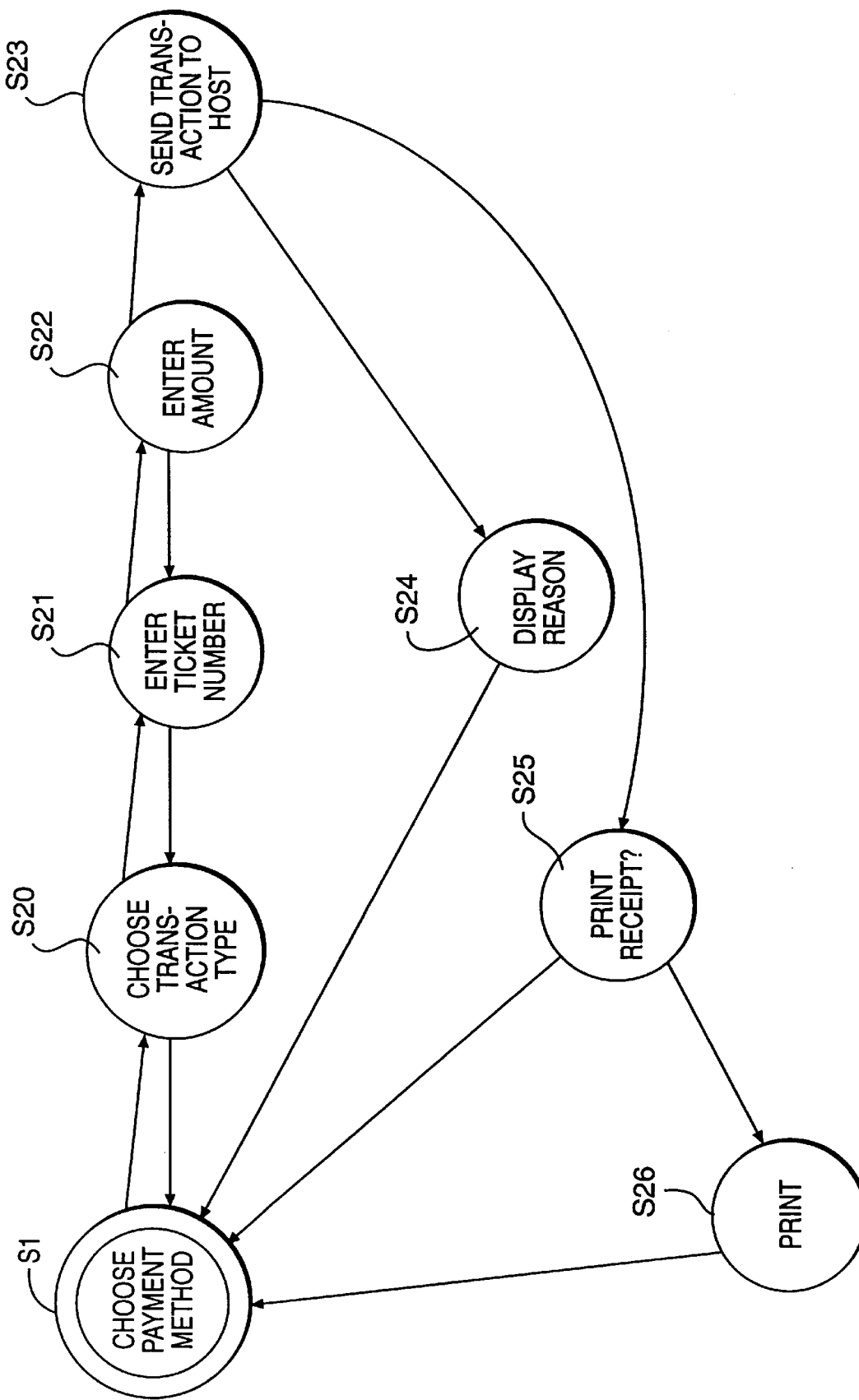
FIG. 12B is a state diagram illustrating a cancel credit process.

FIG. 12B illustrates state diagrams showing the transitions between various states as terminal processor 47 is performing processing relating to the cancellation of a credit transaction. While terminal processor 47 is in state S1, the dealer may press a cancel button on keypad 70, in which case the process will proceed to state S20, where the dealer is prompted on display 72 to choose a transaction type to be cancelled. At that point, the dealer may press the clear button which will return the process to state S1, or indicate the type of transaction to be cancelled, in this case indicating that it is a credit transaction. If this occurs, the process will proceed from state S20 to state S21.

While in state S21, terminal processor 47 will prompt the dealer via display 72 to enter a ticket number (corresponding to the ticket which corresponds to the transaction to be cancelled). If the clear button is pressed on keypad 70, the process will return to state S20. However, if a number is entered while in state S21, the process will proceed from state S21 to state S22. At this point, the dealer may be prompted via display 72 to enter an amount of money to be cancelled. If the dealer enters an amount, the process will proceed from state S22 to state S23. However, if while in state S22, the dealer presses a cancel button, the process will return to state S20.

While in state S23, terminal processor 47 will forward the transaction to host processor 37 via local controller processor 30, and will await a response from host processor 37 via local controller processor 30. Once a response is received, the process will proceed from state S23 to either of states S24 or S25. If the transaction was rejected by host processor 37, the process proceeds to state S24. If the transaction was accepted by host processor 37, the process proceeds to state S25.

In state S24, a reason for rejection is displayed by display 72, and the process is subsequently returned to state S1 after either a clear button is pressed or a certain amount of time has elapsed (e.g., 30 seconds). From state S25, a print receipt prompt may be provided to the dealer via display 72. If a receipt is desired and such a request is indicated through the use of keypad 70, the process will proceed to state S26, where a receipt will be printed and the process will return to state S1 once the printing is completed. If no receipt is desired, the process will proceed from state S25 directly to state S1.

Figure 12C:
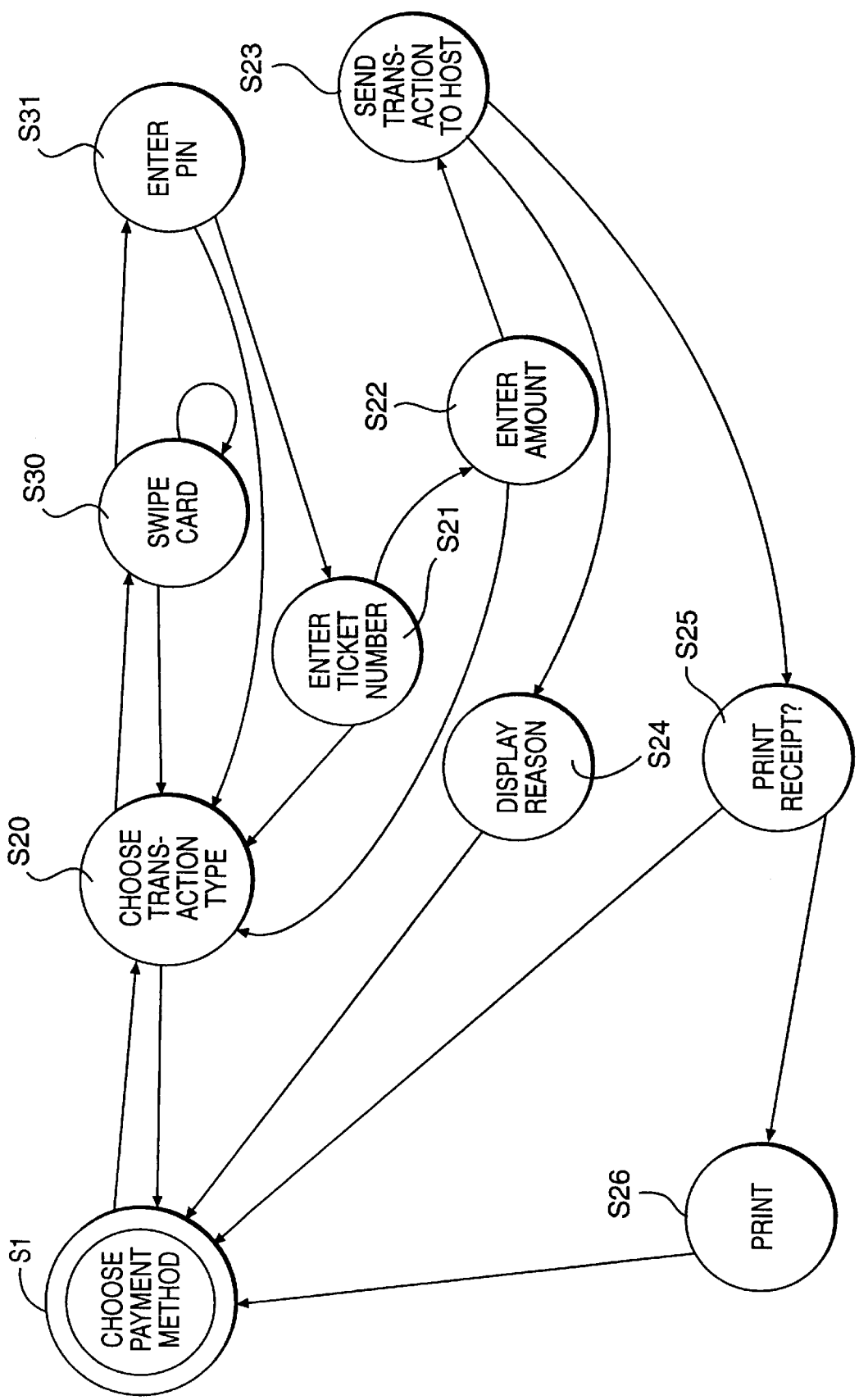
FIG. 12C is a state diagram illustrating a cancel debit process.

FIG. 12C is a state diagram illustrating the processing which may be formed by a terminal processor 47 when processing a cancel debit transaction. Again, the process commences at state S1 where a payment method is chosen. If a cancel button is pressed through the use of keypad 70, the process will proceed to state S20. If the transaction type is a debit type of transaction, which is indicated by the dealer through the use of keypad 70, the process will proceed to state S30, at which point the dealer will be prompted to swipe the debit card through magnetic strip reader 74. If the swipe is not performed properly and the data obtained is not clean, the process will remain in state S30 and again prompt the dealer to swipe the debit card.

If the dealer presses a clear button on keypad 70, the process will return from state S30 to state S20. If a good swipe is performed, the process will proceed from state S30 to state S31, where the dealer will be prompted via display 72 to enter a PIN. The customer may then enter his or her pin, or press a clear button. If a clear button is pressed, the process will return to state S20. If a PIN is entered, the process will proceed from state S31 to state S21.

In state S21, the dealer will be prompted to enter a ticket number. If the ticket number is entered, the process proceeds from state S21 to state S22. If while in state S21, a clear button is pressed, the process will return directly to state S20. If an amount is entered while in state S22, the process will proceed to state S23. While in state S23, the terminal processor 47 will forward the transaction to host processor 37 and await a response from host processor 37 via local controller processor 30.

If a rejection is received from host processor 37, the process will proceed from state S23 to state S24, and a reason will be displayed on display 72 for the rejection. After an elapse of time (e.g., 30 seconds), or the pressing of a clear button on keypad 70, the process will proceed from state S24 to state S1.

If an acceptance of the transaction is received from host processor 37, terminal processor 47 will proceed from state S23 to state S25 where the dealer will be prompted to indicate whether a receipt is desired. If a receipt is requested via the use of keypad 70, the process will proceed from state S25 to state S26. If not, the process will proceed directly from state S25 to state S1. In state S26, a receipt will be printed, and after the receipt is printed, the process will return to state S1.

Figure 12D:
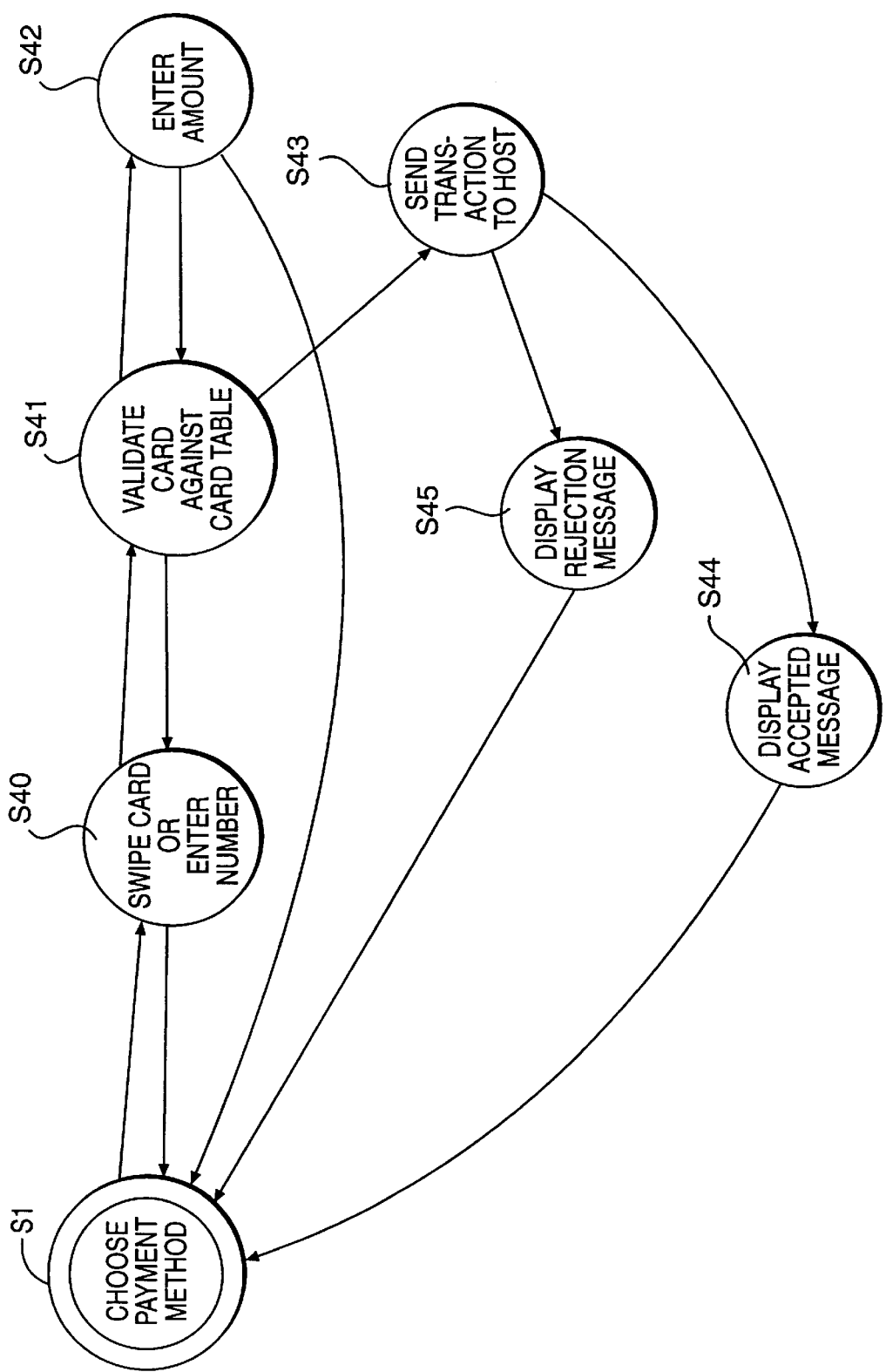
FIG. 12D is a state diagram illustrating an authorization process.

FIG. 12D is a state diagram illustrating the processing that may be performed by processor 47 in order to authorize a transaction. In state S1, a payment method is chosen by the dealer. If at this point an account number is entered, the process will proceed directly to state S40 where the customer will be prompted to swipe the card or enter the number of the card. If a card is swiped or a number is entered at state S40, the process will proceed to state S41. However, if while in state S40, a clear button in keypad 70 is pressed, the process will return to state S1.

While in state S41, the card is validated against a card table. If the validation fails the process will return from state S41 to state S40. While terminal processor 47 is in state S41, if extra data is required, it will proceed to state S42, where the dealer will be prompted by a display 72 to enter an amount for validation. This is the amount that the customer will need to complete the sale transaction. For example, suppose a customer wishes to purchase $200 in goods and services. The amount that would be entered at this point would be $200.

While in state S42, if an amount is entered, the process will return to state S41. At that point, if the validation fails, the process will proceed to state S40. If the validation passes and the card is okay, for the requested amount, the process will proceed from state S41 to state S43. In state S43, the transaction will be forwarded to, and a response will be awaited from, host processor 37 via local controller processor 30. Once a response is received, the process will proceed to state S44 or state S45.

The process proceeds from state S43 to state S44 if the authorization is accepted by host processor 37. The process proceeds from state S43 to state S45 if the transaction is rejected. In state S44, terminal processor 47 will cause an acceptance message to be displayed on display 72. In state S45, a rejection message will be displayed on display 72. From both states S44 and S45, the process will return to S1 upon pressing of a clear or enter key or after the elapse of a certain amount of time (e.g., 30 seconds).

As disclosed above, extension portion 14 will preferably be provided with a mechanism for encrypting data before it is forwarded to main portion 12, and subsequently forwarded to host processor 37 via terminal 47 and local controller processor 30. The method for encryption may comprise DES encryption. An exemplary specific method for performing DES encryption is disclosed in the above-noted POS Terminal Specifications manual issued Jan. 24, 1994, and revised Nov. 2, 1994, the content of which is hereby expressly incorporated by reference herein in its entirety.

Figure 13:
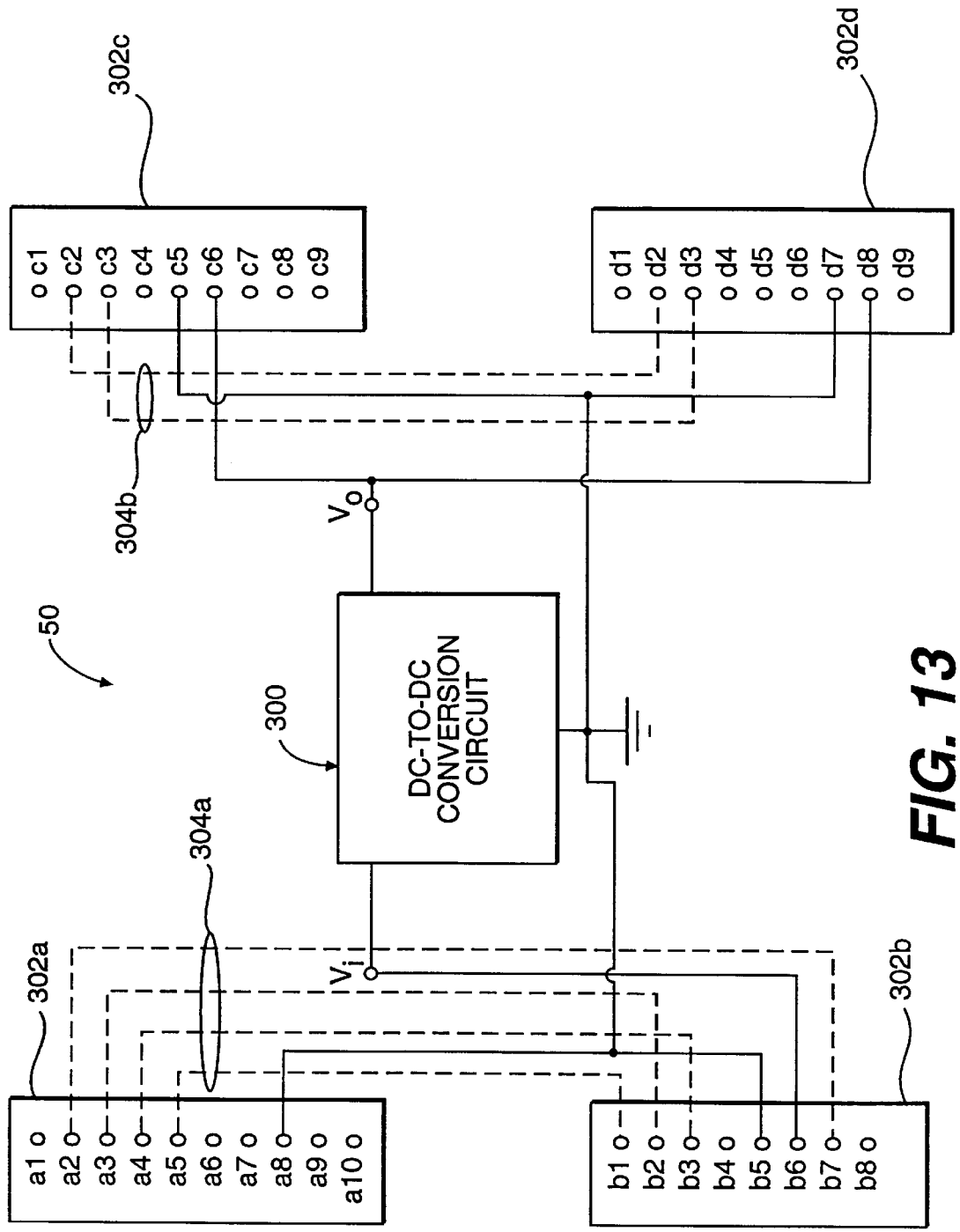
FIG. 13 is a circuit diagram of a data power bus which may be employed to interconnect the components of the main portion.
Figure 14:
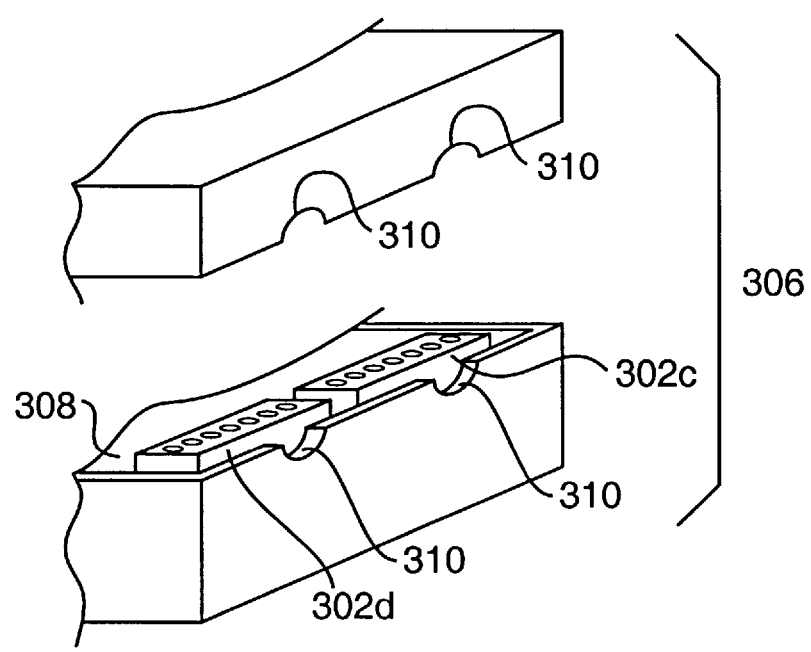
FIG. 14 is a perspective view of part a housing assembly containing the bus illustrated in FIG. 13.

FIG. 13 illustrates a DC-to-DC conversion circuit 300 coupled to a plurality (four, in the illustrated embodiment) of multipin connectors 302a–302d which together may comprise a data and power bus 50 as illustrated in FIG. 3. FIG. 14 illustrates a partial view of a box assembly within which multipin connectors 302a–302d and DC-to-DC conversion circuit 300 may be provided in order to provide a connection mechanism for securely receiving and interconnecting the cables that extend between the various devices illustrated in FIG. 3, including printer 44, RF modem 46 and extension portion 14.

Multipin connectors 302a and 302d correspond respectively to first and second interfaces 86 and 88 of RF modem 46. Multipin connector 302b corresponds to printer 44. Multipin connector 302c corresponds to extension portion 14. More specifically, first interface 86 is connected to multipin connector 302a with a suitable cable. Second interface 88 is connected to multipin connector 302d with a suitable cable. Printer 44 is connected to multipin connector 302b with a suitable cable, and an extension portion interface 94 is connected to multipin connector 302c with a suitable cable. Accordingly, four separate external connecting cables may be provided for establishing the various connections between the various devices. Each cable, of course, should be provided with a multipin connector which can be mated with the corresponding multipin connector provided as part of the data and power bus to establish all necessary connections. As a result of these connections, a data connection (including plural data lines) is established between first interface 86 and printer 44 via data connections 304a and a data connection (including plural data lines) is established between second interface 88 and extension portion 14 via data connections 304b.

In the illustrated embodiment, a complete portable POS terminal 10 includes only one DC battery, provided within the housing of printer 44. Accordingly, in the data and power bus 50 shown in FIG. 13, the DC input power Vi of DC-to-DC conversion circuit 300 is provided by a terminal b6 which corresponds to a power output terminal of printer 44 connected to the positive terminal of the battery. The corresponding ground terminal of DC-to-DC conversion circuit 300 is connected to a ground terminal b5 of the printer multi-pin connector 302b which corresponds to the negative terminal of the battery.

DC-to-DC conversion circuit 300 converts the DC voltage $V_i$ which is provided by the DC battery within printer 44 to an output voltage $V_o$, which serves as input power provided to extension portion 14 via multipin connector 302c and provided to RF modem 46 via multipin connector 302d.

The other connections are provided for exchanging data between RF modem 46 and each of printer 44 and extension portion 14. More specifically, data connections 304a are provided between certain pins of multipin connection 302a and other corresponding pins of multipin connector 302b. Similarly, data connections 304b are provided between certain pins of multipin connection 302c and other corresponding pins of multipin connector 302d.

The general structure and general configuration of the data and power connections are established by data and power bus 50, as illustrated in the specific embodiment shown in FIG. 13, allow a connection box to be provided which securely houses the illustrated data and power bus 50. the connection box may have crimping portions for securely receiving and holding the mating ends of the various cables within the box.

FIG. 14 illustrates a two-piece cable connecting box 306. A printed circuit board (PCB) 308 is provided, upon which each of the elements of DC-to-DC conversion circuit 300, the electrical connections, and the multi-pin connectors 302a–302d illustrated in FIG. 13 may be provided. Multipin connectors 302c and 302d are viewable in FIG. 14. Cable box 306 comprises an upper piece and a lower piece. The upper piece may be fixedly secured (e.g., with glue, screws, etc.) to the lower piece. Cable box 306 further comprises recessed portions 310 each of which is adapted to appropriately crimp a cable having a connector connected to one of the multipin connectors 302a–302d provided within cable box 306. Such recesses, or other proper strain relief mechanisms, may be provided in order to ensure that strains and external forces applied to the cables do not adversely effect the circuitry or the connectors provided within cable box 306.

In operation, a POS system as disclosed herein (for example, the specific POS system 40 illustrated in FIG. 2) will be very useful in processing card transactions for gasoline purchases and other automobile-related service and automobile-related purchases. The illustrated POS system will eliminate the need to perform credit card and other card processing by walking indoors or by walking over to an island card reader to swipe a card and/or print receipts. In addition, the customer will not have to entrust a service attendant with his or her card as it is carried out of plain view.

The disclosed system and process will provide added efficiency to the performance of sale transactions, including both the delivery component and the payment component of such transactions. The dealer (a gas station attendant in the environment illustrated in FIG. 1) can continuously focus on serving a particular customer without being distracted. Since complete sale transactions may be commenced and completed without requiring the dealer to leave a particular location, the sale transaction can be made more efficiently. In addition, debit transactions and transactions requiring the input of a PIN can be processed right at the point of sale, e.g., at a customer's car in a gas station environment. This will also allow the use of debit cards, credit cards with PINs, and prepaid cards.

The POS system 40 illustrated in FIG. 2 may be further provided with an RF scanner which can scan information regarding the identity of customers visiting the establishment. Such information may be obtainable if, e.g., an RF scanner is provided on the customer's vehicle. Other types of scanners can be provided as well to allow reading of information from a suitable information storing mechanism carried by the customer or attached to the customer's vehicle. Such information can be conveyed to a processing system and/or a database, e.g., for use later in promotions and inventory management. A computer can also be provided which collects and dispenses information for various uses, including, for example, assisting customers in obtaining directions, notifying customers of traffic or weather information, and providing customers with certain types of goods and services in accordance with the known preferences of that particular customer.

POS system 40 may be further integrated with a remote cash register and pump controller, which will allow the attendant to perform cash transactions right at the pump, without having to enter a building out of the site of the customer. POS system 40 may also comprise an optical bar-code scanner for scanning goods being purchased, in order to facilitate the prompt and accurate registering of the prices and descriptions of items being purchased. Such an optical bar-code scanner may be provided as part of either extension portion 14 or main portion 12, or it may be a separate device.

POS system 40 may be provided in other commercial environments, for example, in refreshment and food establishments, at grocery stores or at ball games. Orders for food, refreshments or other items or services may be processed with a POS system and transmitted (e.g., via an RF transmitter) to a deliverer who could deliver the item or service while the payment component of the sale transaction is being completed.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structures, means, and uses such as are within the scope of the appended claims.

What is claimed is:

1. A portable point-of-sale (POS) terminal for communicating with a point-of-sale host system, said point-of-sale terminal comprising:

a main portion for communicating with said point-of-sale host system, an extension portion and means for coupling said main portion to said extension portion so that said extension portion is separable by a minimum distance from said main portion while said extension portion remains coupled to said main portion;

said main portion having a total weight and outer dimensions permitting a person to carry said main portion with little physical exertion and comprising:
a two-way communications subsystem; and
a main portion processor for processing a sale transaction and sending and receiving sales data to and from said host via said two-way communications subsystem;

said extension portion having a total weight and outer dimensions permitting a person to carry said extension portion with little physical exertion and comprising:
reading means for reading financial account data from an account authorization device;
inputting means for inputting a security code access key; and
means for generating encrypted data representative of said security code access key and forwarding said encrypted data to said main portion.

2. The POS terminal according to claim 1, wherein said security code access key comprises a personal identification number (PIN).

3. The POS terminal according to claim 1, wherein said extension portion comprises a display device and means for displaying on said display device a message prompting a customer to input a security code access key.

4. The POS terminal according to claim 1, wherein said reading means comprises a magnetic strip reader.

5. The POS terminal according to claim 1, further comprising a harness adapted to support and strap said main portion to a part of the person's body.

6. The POS terminal according to claim 5, wherein the part of the person's body comprises the person's torso.

7. The POS terminal according to claim 1, further comprising said host, wherein said host comprises an off-site host computer system.

8. The POS terminal according to claim 1, wherein said two-way communications subsystem comprises an RF transmitter and receiver.

9. The POS terminal according to claim 1, wherein said inputting means comprises a keypad.

10. The POS terminal according to claim 1, wherein said main portion comprises a printer for printing a receipt including alphanumeric characters identifying certain portions of said sales data.

11. Plural POS terminals according to claim 1 in combination with a local controller for receiving sales data provided by plural portable POS terminals and forwarding said sales data to said host, and for receiving authorization data provided by said host and providing said authorization data to destined portable POS terminals.

12. Plural POS terminals in combination with said local controller according to claim 11, wherein said local controller comprises a local controller memory for storing local reference copies of tabulated data for use by said plural portable POS terminals.

13. Plural POS terminals in combination with said local controller according to claim 12, wherein said tabulated data comprises information regarding tax rates and prices corresponding to different categories of products and services.

14. Plural POS terminals in combination with said local controller according to claim 12, wherein said tabulated data comprises extra verification information provided by said host, said extra verification information being used by said POS terminals to verify that an account authorization device is authentic.

15. A point-of-sale (POS) system comprising a point-of-sale host system and plural POS terminals for communicating with said host system, said host system being provided at a central off-site location far from a location at which said plural POS terminals are deployed, each said POS terminal comprising:

a main portion for communicating with said point-of-sale host system, an extension portion and means for coupling said main portion to said extension portion so that said extension portion is separable by a minimum distance from said main portion while said extension portion remains coupled to said main portion;

said main portion having a total weight and outer dimensions permitting a person to carry said main portion with little physical exertion and comprising:
a two-way communications subsystem; and
a main portion processor for processing a sale transaction and sending and receiving sales data to and from said host via said two-way communications subsystem;

said extension portion having a total weight and outer dimensions permitting a person to carry said extension portion with little physical exertion and comprising:
reading means for reading financial account data from an account authorization device;
inputting means for inputting a security code access key; and
means for generating encrypted data representative of said security code access key and forwarding said encrypted data to said main portion.

16. The POS system according to claim 15, wherein said security code access key comprises a personal identification number (PIN).

17. The POS system according to claim 15, wherein said extension portion comprises a display device and means for displaying on said display device a message prompting a customer to input a security code access key.

18. The POS system according to claim 15, wherein said reading means comprises a magnetic strip reader.

19. The POS system according to claim 15, further comprising a harness adapted to support and strap said main portion to a part of the person's body.

20. The POS system according to claim 19, wherein the part of the person's body comprises the person's torso.

21. The POS system according to claim 15, wherein said two-way communications subsystem comprises an RF transmitter and receiver.

22. The POS system according to claim 15, wherein said inputting means comprises a keypad.

23. The POS system according to claim 15, wherein said main portion comprises a printer for printing a receipt including alphanumeric characters identifying certain portions of said sales data.

24. The POS system according to claim 15, further comprising a local controller for receiving sales data provided by plural portable POS terminals and forwarding said sales data to said host, and for receiving authorization data provided by said host and providing said authorization data to destined portable POS terminals.

25. The POS system according to claim 15, wherein said local controller comprises a local controller memory for storing local reference copies of tabulated data for use by said plural portable POS terminals.

26. The POS system according to claim 25, wherein said tabulated data comprises information regarding tax rates and prices corresponding to different categories of products and services.

27. The POS system according to claim 25, wherein said tabulated data comprises extra verification information provided by said host, said extra verification information being used by said POS terminals to verify that an account authorization device is authentic.

* * * * *